US007925922B2

(12) United States Patent
Baba et al.

(10) Patent No.: US 7,925,922 B2
(45) Date of Patent: Apr. 12, 2011

(54) FAILOVER METHOD AND SYSTEM FOR A COMPUTER SYSTEM HAVING CLUSTERING CONFIGURATION

(75) Inventors: Tsunehiko Baba, Hachioji (JP); Yutaka Nakamura, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 226 days.

(21) Appl. No.: 12/379,566

(22) Filed: Feb. 25, 2009

(65) Prior Publication Data

US 2010/0011242 A1    Jan. 14, 2010

(30) Foreign Application Priority Data

Jul. 10, 2008  (JP) .................................. 2008-179707

(51) Int. Cl.
G06F 11/00 (2006.01)
(52) U.S. Cl. .......................................... 714/11; 714/47
(58) Field of Classification Search ................ 714/4, 11, 714/12, 47
See application file for complete search history.

(56) References Cited

U.S. PATENT DOCUMENTS

| 5,909,540 A * | 6/1999 | Carter et al. ..................... 714/4 |
| 6,108,699 A * | 8/2000 | Moiin ........................... 709/221 |
| 7,016,946 B2 * | 3/2006 | Shirriff ......................... 709/221 |
| 7,467,322 B2 * | 12/2008 | Baba ................................ 714/4 |
| 7,590,895 B2 * | 9/2009 | Fujibayashi ..................... 714/47 |
| 2002/0152425 A1 * | 10/2002 | Chaiken et al. ................. 714/23 |
| 2005/0229022 A1 | 10/2005 | Koishi et al. |
| 2005/0289390 A1 | 12/2005 | Baba |
| 2006/0224728 A1 | 10/2006 | Baba |
| 2006/0242453 A1 * | 10/2006 | Kumar et al. ..................... 714/4 |
| 2008/0184061 A1 * | 7/2008 | Tripathi et al. ................... 714/4 |
| 2008/0301491 A1 * | 12/2008 | Jones et al. ....................... 714/4 |
| 2010/0011242 A1 * | 1/2010 | Baba et al. ...................... 714/11 |

FOREIGN PATENT DOCUMENTS

| JP | 2005-293315 | 10/2005 |
| JP | 2006-011992 | 1/2006 |
| JP | 2006-285810 | 10/2006 |

* cited by examiner

*Primary Examiner* — Marc Duncan
(74) *Attorney, Agent, or Firm* — Antonelli, Terry, Stout & Kraus, LLP.

(57) ABSTRACT

A failover method for a computer system having a clustering configuration, in which among a plurality of computers having the clustering configuration, any one of computers, when detecting a malfunction of a system including a certain computer, transmits a detection of the system malfunction to computers configuring the other systems, and the any one of computers, when detecting the malfunction of the system including the certain computer and receiving malfunction notifications of the system including the certain computer from the computers configuring the other systems, issues a reset request to the certain computer.

16 Claims, 24 Drawing Sheets

FIG.2

| SYSTEM IDENTIFIER 201 | SYSTEM STATUS 202 | NUMBER OF MALFUNCTION DETECTION COMPUTERS 203 | WAITING TIMER 204 | RESET TIMER 205 |
|---|---|---|---|---|
| SYSTEM A | MALFUNCTION | 2 | 10 | 10 |
| SYSTEM B | NORMALITY | — | — | — |
| SYSTEM C | NORMALITY | — | — | — |

FIG.3

| NUMBER FAILOVER ALLOWABLE COMPUTERS | 2 |
|---|---|

| 401 | RESET PRIORITY | SYSTEM A:3 | SYSTEM B:2 | SYSTEM C:1 |
|---|---|---|---|---|
| 402 | RESET INTERVAL | 5 SECONDS | | |

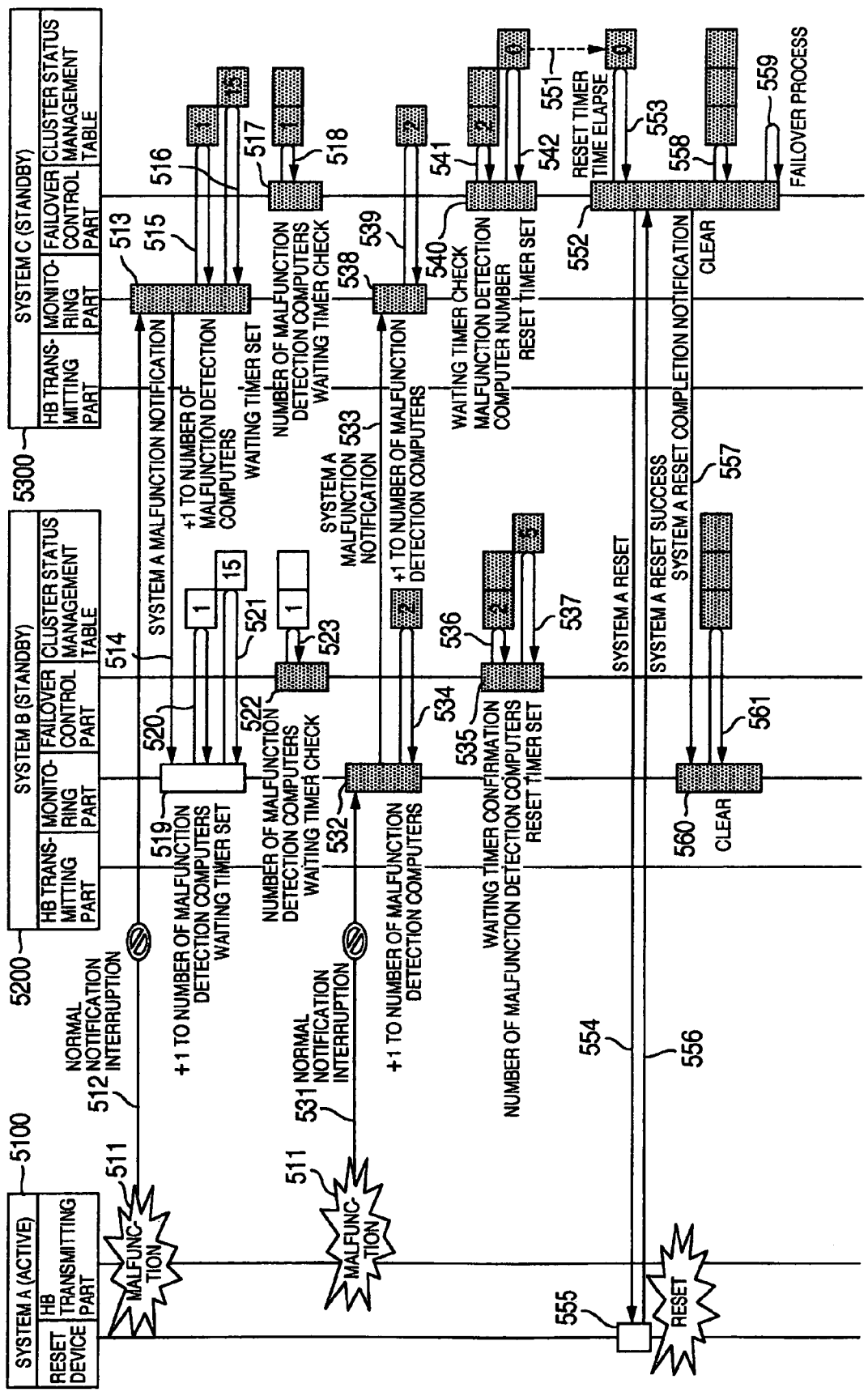

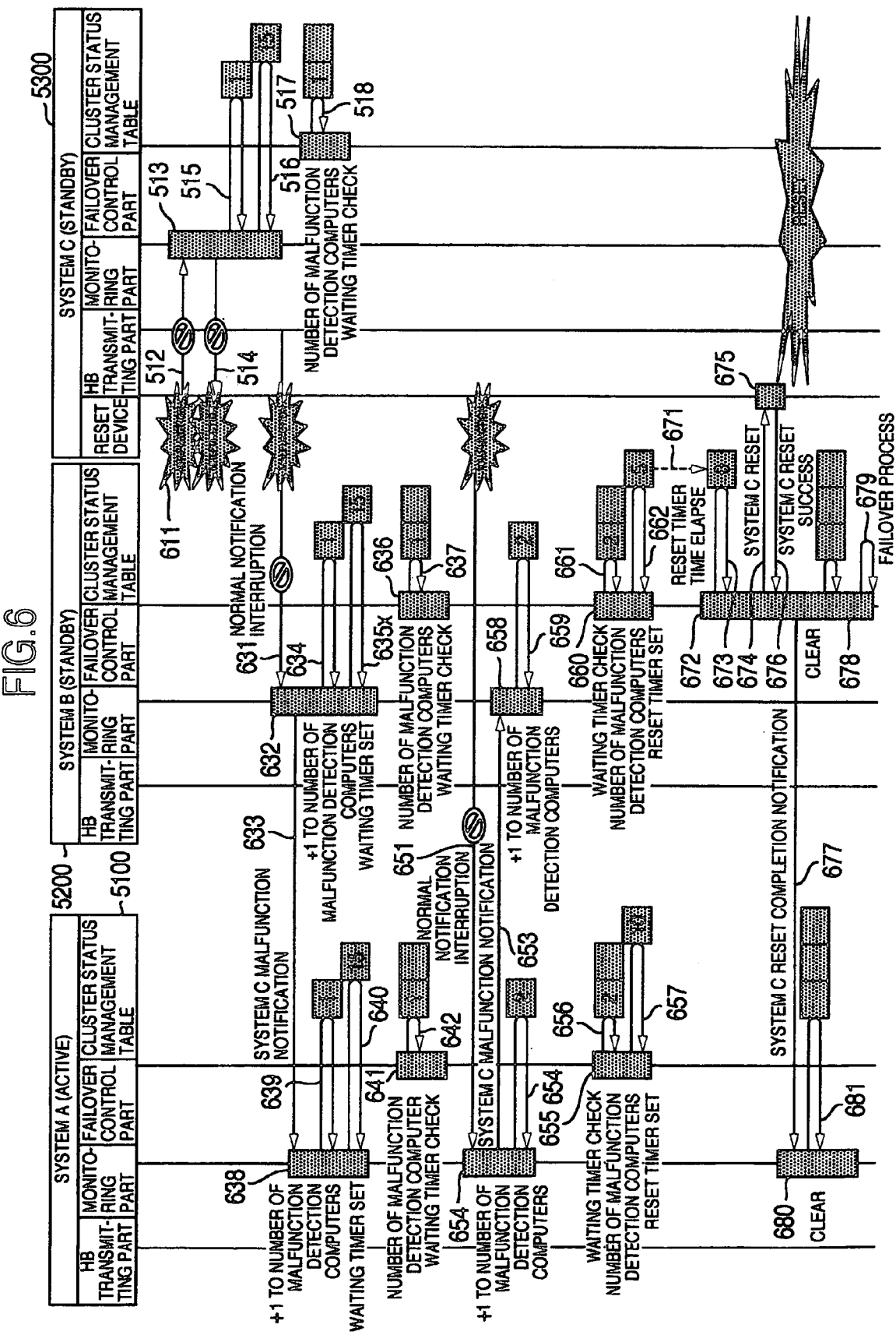

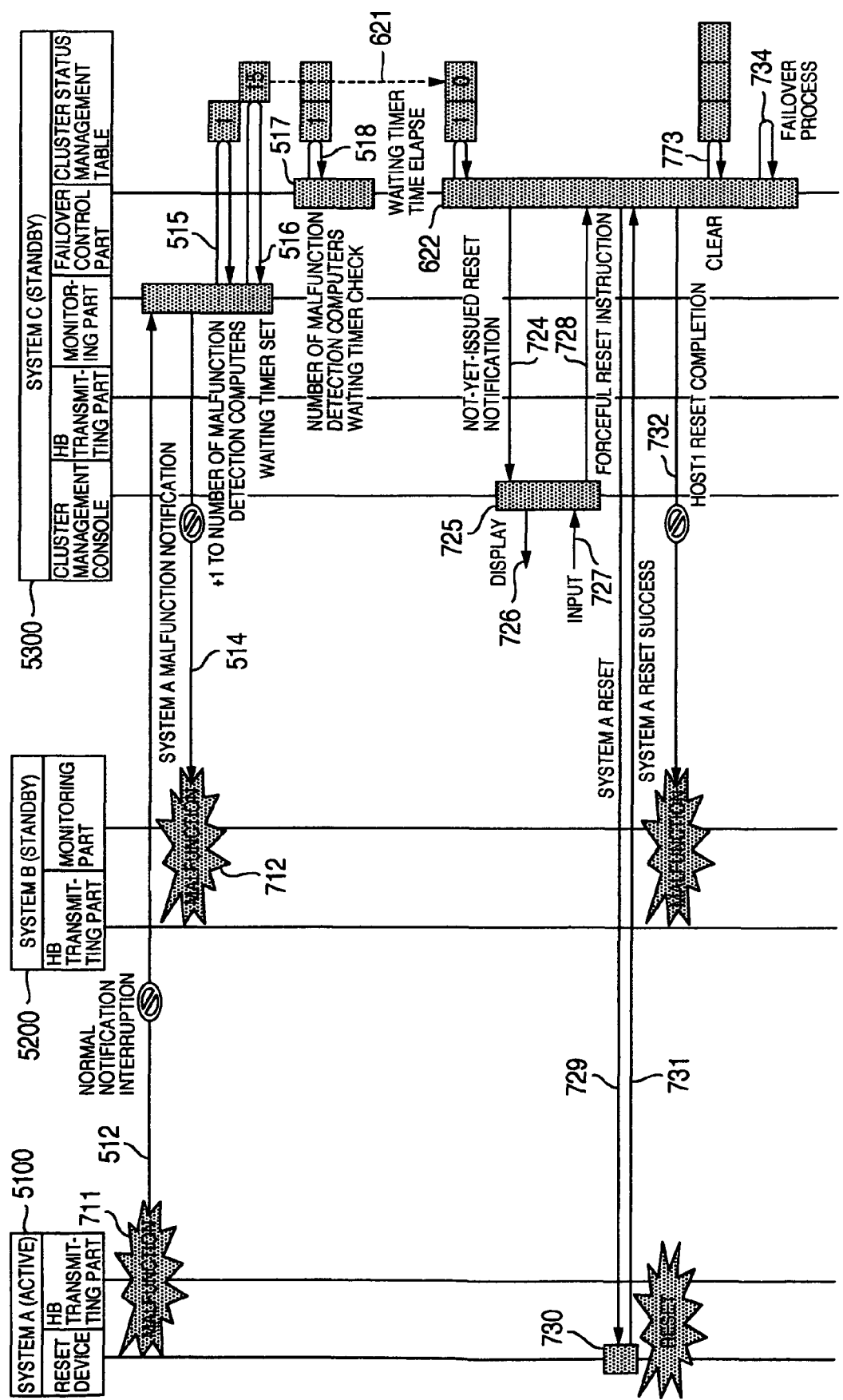

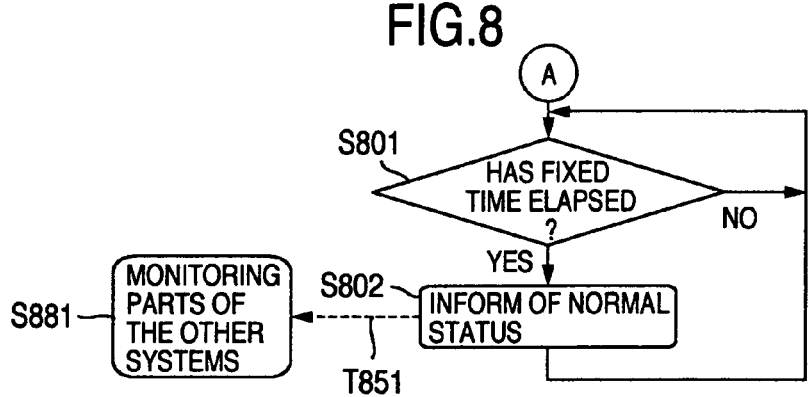
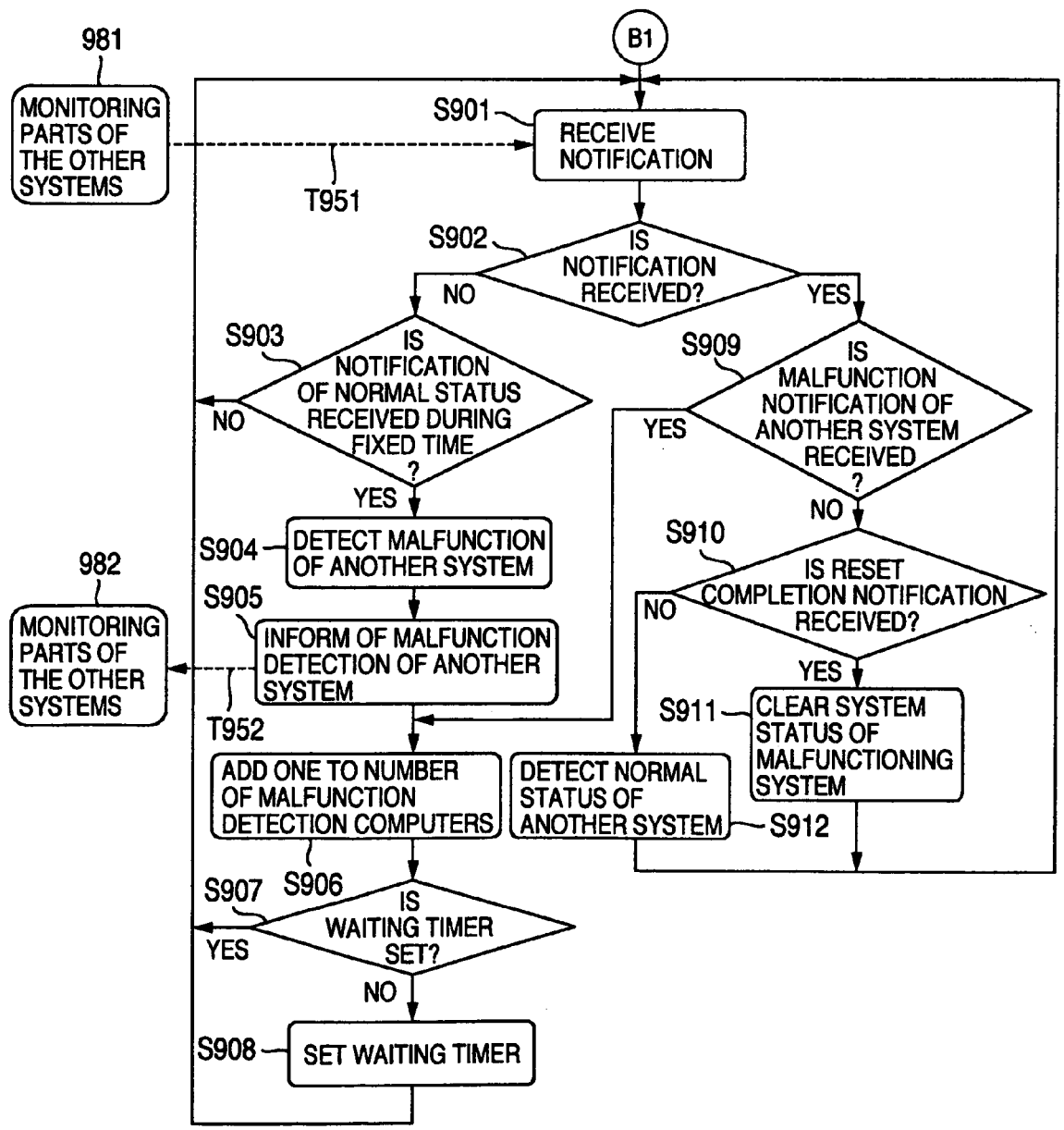

FIG.15

| SYSTEM IDENTIFIER (201) | SYSTEM STATUS (202) |
|---|---|
| SYSTEM A | MALFUNCTION |
| SYSTEM B | NORMAL |
| SYSTEM C | NORMAL |

FIG.16

| MALFUNCTIONING SYSTEM IDENTIFIER (RESET DESTINATION SYSTEM IDENTIFIER) (1601) | NUMBER OF MALFUNCTION DETECTION COMPUTERS (NUMBER OF RESET SOURCE SYSTEMS) (1602) | MALFUNCTION DETECTION SOURCE IDENTIFIER (RESET SOURCE SYSTEM IDENTIFIER) (1603) | | |
|---|---|---|---|---|
| SYSTEM A | 2 | SYSTEM B | STYSTEM C | |

FIG.25

| SYSTEM IDENTIFIER (201) | SYSTEM STATUS (202) | NUMBER OF MALFUNCTION DETECTION COMPUTERS (203) | MALFUNCTION DETECTION SOURCE IDENTIFIER (2501) | | WAITING TIMER (204) | RESET TIMER (205) |
|---|---|---|---|---|---|---|
| SYSTEM A | MALFUNCTION | 2 | SYSTEM D | SYSTEM B | 10 | 5 |
| SYSTEM B | NORMALITY | — | | | — | — |
| SYSTEM C | NORMALITY | — | | | — | — |
| SYSTEM D | NORMALITY | — | | | — | — |
| ⋮ | ⋮ | ⋮ | ⋮ | | ⋮ | ⋮ |
| SYSTEM Z | NORMALITY | — | | | — | — |

FIG.26

| RESOURCE TYPE (2601) | ALLOWABLE RESOURCE AMOUNT (2602) |
|---|---|
| PROCESSOR | 55% |
| MEMORY | 8GB |
| JOB PATH | 800Mbps |

FIG.27

| PHYSICAL COMPUTER IDENTIFIER (2701) | SYSTEM IDENTIFIER (2702) | RESOURCE AMOUNT (2703) | | |
|---|---|---|---|---|
| | | PROCESSOR (2704) | MEMORY (2705) | JOB PATH (2706) |
| PHYSICAL COMPUTER A | SYSTEM A | 50% | 8GB | 600Mbps |
| | SYSTEM X | 35% | 4GB | 50Mbps |
| | NOT-YET-ALLOCATION | 15% | 0GB | 350Mbps |
| PHYSICAL COMPUTER B | SYSTEM B | 40% | 5GB | 300Mbps |
| | SYSTEM C | 45% | 6GB | 400Mbps |
| | NOT-YET-ALLOCATION | 15% | 1GB | 300Mbps |
| PHYSICAL COMPUTER C | SYSTEM D | 30% | 7GB | 400Mbps |
| | SYSTEM Y | 35% | 4GB | 100Mbps |
| | NOT-YET-ALLOCATION | 35% | 1GB | 500Mbps |

FAILOVER METHOD AND SYSTEM FOR A COMPUTER SYSTEM HAVING CLUSTERING CONFIGURATION

INCORPORATION BY REFERENCE

The present application claims priority from Japanese application JP2008-179707 filed on Jul. 10, 2008, the content of which is hereby incorporated by reference into this application.

BACKGROUND OF THE INVENTION

The present invention relates to a computer system having a currently-active system computer that runs an application and a standby system computer; and, more particularly, the present invention relates to a computer system that performs a failover control, in which when a malfunction occurs in the program of a computer or an operating system which is running an application, another computer is allowed to take over the application being run.

In an application system requiring malfunction tolerance capability, reliability can be secured by using a computer having a clustering configuration that includes a currently-active system server computer that executes a data process by a plurality of server computers and a standby system server computer that takes over the data process in case a malfunction occurs in the currently-active system computer. In the application in which data is stored in a disk as in database (DB), data is taken over from the currently-active system server computer and the standby system server computer using an accessible shared disk, and the process is continued by the standby system server computer. Accordingly, the I/O processing for synchronously writing data in the disk is required, and system performance is determined by the I/O processing performance.

In recent years, in the application system used over a wide range, system performance beyond the performance that is determined by the above-described I/O performance is required in many cases. To cope with such a request, an in-memory application system in which data is stored only in a memory and the system performance is improved by eliminating synchronous I/O processing to a disk device is appearing on the scene. In this in-memory application system, data stored in the memory cannot be directly shared with the standby system server computer. Therefore, for example, as in an in-memory DB, in the application requiring the malfunction tolerance capability such that the data stored in the memory is not allowed to be lost by a malfunction, duplicates of the data in the currently-active system server computer is stored in the memory of the standby system server computer through the communication from the currently-active system server to the standby system server computer, and thereby, the data is required to be redundantized. As one example of the above in-memory application system to which the malfunction tolerance capability is considered, there is used a memory DB system disclosed in JP-A-2005-293315 corresponding to US2005/0229022. In JP-A-2005-293315, disclosed is a technology in which the currently-active system computer writes in a shared memory in the standby system server computer the data updated by database stored in the currently-active system server computer to thereby duplicate the data in the standby system server computer as well as to thereby assure the data at the time of malfunction.

In this application system requiring the malfunction tolerance capability, there is used a method in which a server computer (malfunctioning server computer) in which a malfunction occurs is reset by a normal server computer in which the malfunction is detected, and further, there is used a technology disclosed, for example, in JP-A-2006-11992 corresponding to US2005/0289390 and JP-A-2006-285810 corresponding to US2006/0224728. In JP-A-2006-11992, disclosed is a technology in which a reset timing by each standby system server computer is different from each other, and thereby, a reset competition is prevented with regard to the technology in which when a standby system server computer detects a malfunction of a currently-active system computer, the standby system server computer that detects the malfunction resets the currently-active system computer to thereby stop the currently-active system server computer as well as to thereby realize a failover. Also, in JP-A-2006-285810, disclosed is a technology in which a reset device receives a reset that is issued at the time of each detecting a malfunction by each standby system server computer and judges each reset competition to thereby prevent the reset competition with regard to the technology in which the failover is realized using the same reset.

SUMMARY OF THE INVENTION

In a technology disclosed in JP-A-2006-11992 and JP-A-2006-285810, one certain standby system server computer, when detecting a malfunction of the other server computers including a currently-active system server computer, resets those computers to perform the failover and therefore, one currently-active system server computer operates after the failover. Examples of the malfunction detection of the other server computers here include a case where the one standby system server computer cannot communicate with the other computers due to a malfunction of a monitoring network, and a case where a malfunction occurs in a certain server computer itself. When a malfunction occurs in any one of the other server computers, a reset is issued to the server computer and thereafter, the failover may be performed by the other computers. However, when a malfunction occurs in the monitoring network, a currently-active system server computer resets a system in which a currently-active system server computer and at least one or more of standby systems server computer operate with high speed regardless of a normal operation, and the one currently-active system server computer that issues the reset performs the failover. In this case, to avoid data loss, the computer that normally operates is required to stop the processing, and as a result, the performance degradation such as a system stop is caused.

Alternatively, the processing is required to be continued while saving the data of the currently-active system server computer by some kind of method. For example, even if using a method for synchronously saving data onto a disk, a problem that performance degradation occurs is similarly caused due to the I/O processing performance. Thus, in the failover method in a cluster system using the reset disclosed in JP-A-2006-11992 and JP-A-2006-285810, there occurs the failover with an unnecessary reset causing the performance degradation.

In view of the foregoing, it is an object of the present invention to prevent an unnecessary reset when a reset is performed between computers to realize the failover in the cluster system.

To accomplish at least one of the above-described objects, according to one aspect of the present invention, there is provided a failover method for a computer system having a clustering configuration, in which among a plurality of computers having the clustering configuration, any one of computers, when detecting a malfunction of a system including a certain computer, transmits a detection of the system malfunction to computers configuring the other systems, and the any one of computers, when detecting the malfunction of the system including the certain computer and receiving malfunction notifications of the system including the certain computer from the computers configuring the other systems, issues a reset request to the certain computer. Here, a case where a certain system detects a malfunction of the other systems includes a case where even if a computer normally operates, a malfunction occurs in a monitoring path used for a malfunction monitoring or bugs occur in a monitoring program for computers in addition to a case where a computer that configures the other systems actually malfunctions.

To accomplish the above objects, according to one aspect of the present invention, a failover method for preventing an unnecessary reset can be provided.

Other objects, features and advantages of the invention will become apparent from the following description of the embodiments of the invention taken in conjunction with the accompanying drawings.

BRIEF DESCRIPTION OF THE DRAWINGS

FIG. 2 shows one example of a cluster status management table according to the first embodiment of the present invention;

FIG. 3 shows one example of failover allowable conditions according to the first embodiment of the present invention;

FIG. 4 shows one example of a reset definition relating to a reset issuance timing according to the first embodiment of the present invention;

FIG. 5 is a sequence diagram illustrating one example of a processing that is performed in the case of satisfying failover allowable conditions according to the first embodiment of the present invention;

FIG. 6 is a sequence diagram illustrating one example of a processing that is performed in the case of not satisfying failover allowable conditions according to the first embodiment of the present invention;

FIG. 7 is a sequence diagram illustrating one different example of a processing that is performed in the case of not satisfying failover allowable conditions according to the first embodiment of the present invention;

FIG. 8 is a flowchart showing one example of a processing for performing a heartbeat monitoring according to the first embodiment of the present invention;

FIG. 9 is a flowchart showing one example of a processing for monitoring a malfunction according to the first embodiment of the present invention;

FIG. 15 shows one example of a cluster status management table according to the second embodiment of the present invention;

FIG. 16 shows one example of a reset status table according to the second embodiment of the present invention;

FIG. 25 shows one example of a cluster status management table according to the third embodiment of the present invention;

FIG. 26 shows one example of failover allowable conditions according to the third embodiment of the present invention;

FIG. 27 shows one example of a resource status table according to the third embodiment of the present invention;

DESCRIPTION OF THE EMBODIMENTS

Figure 1:
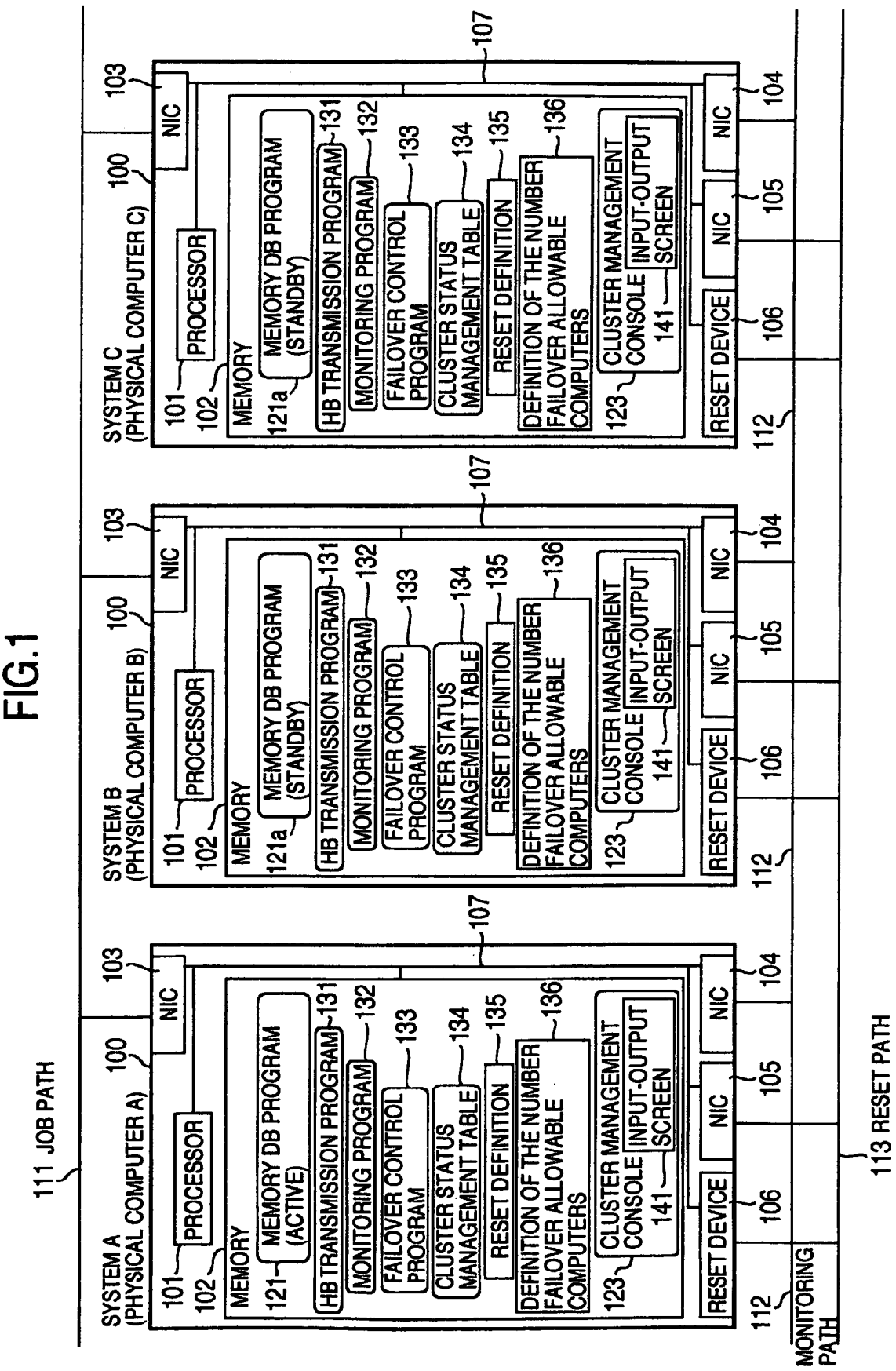
FIG. 1 is a system configuration diagram according to a first embodiment of the present invention.

An embodiment according to the present invention will be described below in detail with reference to the accompanying drawings.

It is to be understood that the diagrams and description related to the present invention have been simplified to show suitable elements for providing a clear understanding of the present invention, and that certain known elements are omitted which do not embody the present invention. This technique includes some conventional elements which should be changed to others which seem to be desirable and/or necessary for implementing the present invention. Those elements, which are known and which cannot facilitate a understanding of the present invention, will not be described here.

Each program may be described below by a module number of a currently-active server computer; however, its description may be made while doubling as a description on programs corresponding to a standby server computer. Further, in the diagram and the subsequent diagrams, the same elements as those shown in another diagram are indicated by the same reference numerals as in the another diagram; further, when a description is omitted, the description may be made similarly to the another diagram.

First Embodiment

FIGS. 1 to 13 illustrate a first embodiment of the present invention. For facilitating an understanding of the subject matter, the first embodiment will be described as an example on a cluster system including three physical computers, and further, is applicable also to a cluster system including three or more physical computers.

FIG. 1 is a block diagram illustrating a configuration of a cluster system according to the first embodiment.

A physical computer 100 according to the first embodiment comprises NICs 103, 104, and 105, a processor 101, a memory 102, and a reset device 106.

The processor 101 executes a program stored in the memory 102 to thereby execute various processes. The memory 102 can store data required for the program and process executed by the processor 101. The NICs 103, 104, and 105 communicate with the other computers (e.g., a client computer or a standby server computer) via a job path 111 and monitoring path 112 as a network. Further, via the reset path 113, the NIC communicates with the reset device 106 that resets the physical computer 100. In addition, the processor 101 has a plurality of cores and may execute a plurality of processes in parallel.

Physical computers 200 and 300 are configured in the same manner as in the above. Hereinafter, a description will be made using the system A5100 as an active server computer, and the systems B5200 and C5300 as a standby server computer.

The memory 102 has a memory DB program 121 that is an example of an application program as an object for performing a failover, and a cluster management console 123.

The memory DB program 121 is acting as an active computer in the system A5100 or as a standby server computer in the systems B5200 and C5300 (memory DB program (standby) 121a is shown in the diagram). A data duplicate is performed via the job path 111 from the active server computer to the standby server computer, and the program 121 has a function of keeping the consistency of data.

The memory 102 stores a cluster status management table 134 showing a status of the server computers, a reset definition 135 having definition notification in relation to a timing for issuing a reset, and a failover allowable computer number definition 136 specifying the number of physical computers as the resource amount required to issue the reset.

Further, the memory 102 has an HB transmission program 131 for reporting a status of the main system (heartbeat: hereinafter, referred to as an HB), a monitoring program 132 monitoring malfunctions of the other systems using HBs from the other systems and reflecting the monitoring results on the cluster status management table 134, and a failover control program 133 issuing resets to the reset devices 106 of the other systems in reference to the table 134. Hereinafter, processors 101 that execute the HB transmission program 131, the monitoring program 132, and the failover control program 133 are referred to as an HB transmitting part, a monitoring part, and a failover control part, respectively.

Further, the monitoring part informs the monitoring parts of the other systems of a malfunction of another system detected to each other. Further, the failover control part performs the failover when the reset of a malfunctioning system is completed.

FIG. 2 shows the cluster status management table 134. The table 134 has columns showing a system identifier 201 of each system, and showing a system status 202 in which a status of a system (server computer) specified by the identifier 201 is represented as "normality", "malfunction", or "not-yet-operation" including resetting. Further, the cluster status management table 134 has columns of a malfunction detection computer number 203 representing the number of computers in which when the system status 202 shows the "malfunction", a malfunction in the system of the identifier 201 is detected, a waiting timer 204 representing a window time in which the detection of a system malfunction in a system specified by the identifier 201 is recognized, and a reset timer 205 representing a window time until resetting a system of the identifier 201. When the timer is set, the waiting timer 204 and the reset timer 205 hold their values. On the other hand, when the timer is not set, and also when the timer is cleared, the reset timer 205 holds information such that the presence of absence of the timer set is known, by holding a symbol except a value, for example, a symbol "–".

FIG. 3 shows one example of the failover allowable computer number definition 136. The definition 136 includes the number of failover allowable computers 301 representing the resource amount required to issue a reset, and FIG. 3 shows an example in which "two computers" is set.

FIG. 4 shows one example of the reset definition 135. The reset definition 135 has columns of a reset priority 401 and a reset interval 402. The reset priority 401 represents a priority of the reset issued by each system. The reset interval 402 represents a time interval issuing the reset so as not to compete each system against each other based on the reset priority 401. In the present embodiment, a value showing the reset priority 401 is represented using numerical values, and an example in which the lowest value shows a top priority is shown. In FIG. 4, the cluster system including three systems, namely, the system A5100, the system B5200, and the system C5300 is set such that the reset priority is ranked in ascending order. Further, "5 seconds" is shown in the column of the reset interval 402, and FIG. 4 shows an example in which the time interval issuing the reset is set to "5 seconds".

The failover control part of each system, when using the reset definition shown in FIG. 4, sets a reset timer at intervals of five seconds in the order corresponding to the reset priority in the case where the reset can be issued in each system. The reset timer of the system with the top priority can be arbitrarily operated in the reset priority; however, for simplifying operations, a description will be made below on a case where the reset timer is set to zero second. Herein, the reset definition 135 shows one example where a method for avoiding a reset competition is determined when a malfunctioning server computer is reset to realize the failover. A definition different from that shown in the present embodiment may be used, and the present embodiment is applicable also to that case.

As one example of the different definitions, for example, the reset priority 401 does not include the reset priorities in all systems, but only the reset priority of the main system may be defined in each system. At this time, each computer communicates with each other and thereby, the reset priority of the cluster system can be determined. Alternatively, a method for dynamically determining the reset priority may be used according to the status of operating applications. At this time, the application status as an index determining the reset priority definition may be defined.

Figure 10:
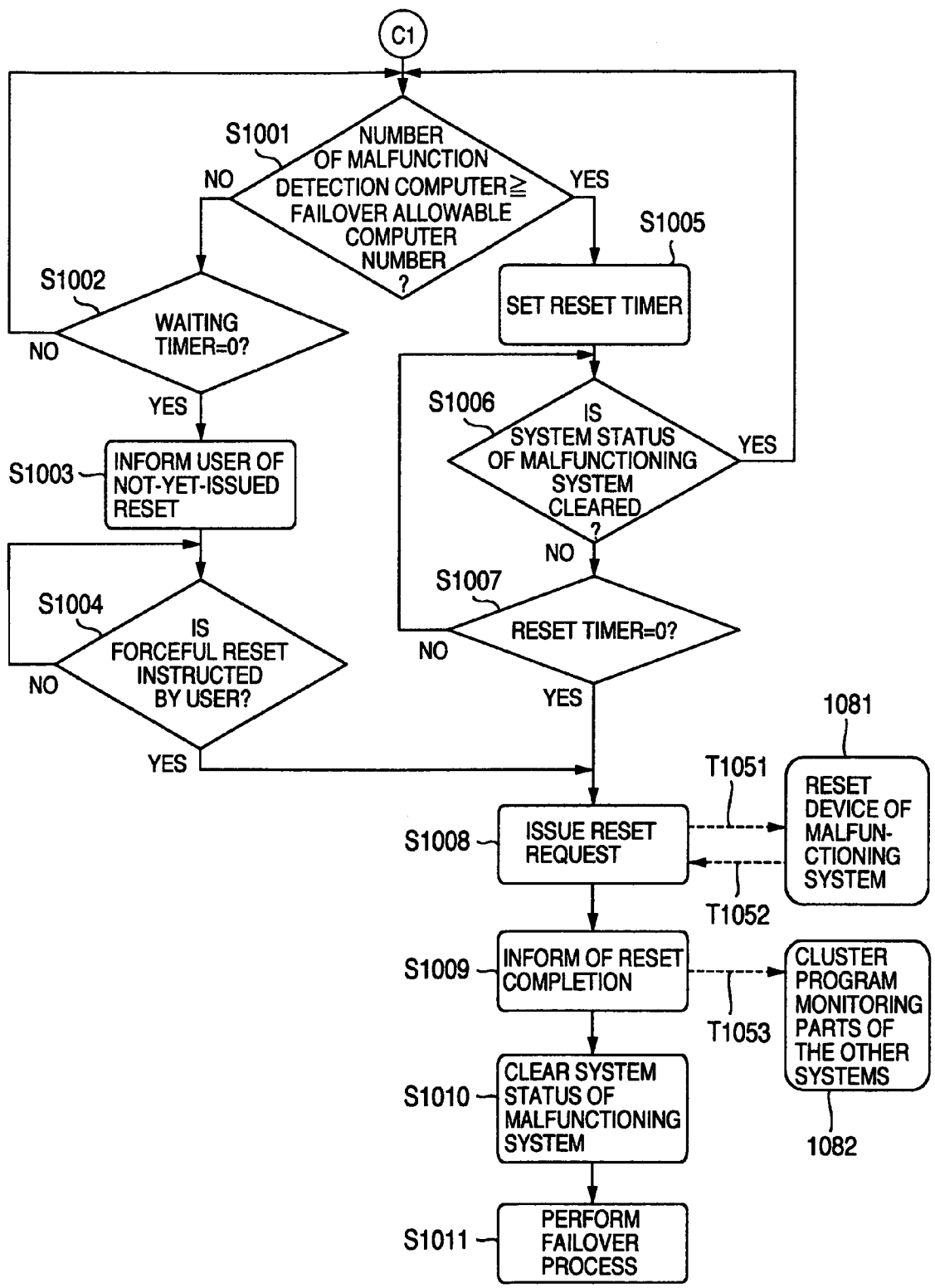
FIG. 10 is a flowchart showing one example of a processing for performing a reset at the time of detecting a malfunction according to the first embodiment of the present invention.

FIGS. 8 to 10 are diagrams showing one example of flowcharts.

FIG. 8 is a flowchart showing a processing for performing a heartbeat by which the HB transmitting part reports a normality of the main system in a fixed time. At first, the HB transmitting part judges whether or not the fixed time for transmitting the HB has elapsed (step S801). When the fixed time has not elapsed, the processing returns to step S801 again. On the other hand, when the fixed time has elapsed, the HB transmitting part informs the monitoring parts 881 of the other systems that the main system is normal via the monitoring path (step S801, T851), and the processing returns to step S801 to transmit the next heartbeat.

Thereby, when a certain system operates normally and the monitoring path is normal, the HB transmitting part can inform the other systems that the main system is normal.

FIG. 9 is a flowchart showing one example of a processing in which the monitoring part monitors a malfunction and which is performed based on the monitoring results.

At first, in FIG. 9, the monitoring part performs step S901 for receiving a notification from the HB transmitting part s or monitoring parts of the other systems, and judges whether or not to receive the notification (step S902). When not receiving the notification, the monitoring part judges whether or not to receive the notification of a normal status from the other systems during the fixed time when the heartbeat is to be transmitted (step S903). When receiving the notification, the processing returns to the reception step S901 of the notification from the other systems again.

On the other hand, in step S903, when not receiving that another system is normal for the fixed time, the monitoring part detects that the another system malfunctions (step S904). In the detection step, the monitoring part stores that a system status of the system A5100 of the cluster status management table 134 is "malfunctioning". Next, via the monitoring path, the monitoring part informs the monitoring parts 982 of the other systems that the self system has detected a malfunction of the another system (step S905). Continuously, the monitoring part adds one to a count of the malfunction detection computer number 203 corresponding to the identifier of the another system detected to malfunction, in the cluster status management table 134 (step S906). In order to judge whether or not to already detect the malfunction, the monitoring part judges whether or not a waiting timer is set (step S907), and when the waiting timer is already set, the processing returns to step S901. On the other hand, when the waiting timer is not yet set, the monitoring part sets in the waiting timer of the cluster status management table 134 a window time waiting for the other systems to detect the malfunction of the system A5100 (step S908), the processing returns to step S901 and continues the monitoring.

On the other hand, in step S902, when receiving the notification, the monitoring part judges whether or not the notification is a malfunction notification T952 of the another system (step S909). When it is the malfunction notification of the another system from the monitoring parts of the other systems, the monitoring part executes processings in step S906 and the subsequent steps. On the other hand, when No (step S909: No), the monitoring part judges whether or not it is a reset completion notification T1053 from the monitoring part of another system (step S910). When it is the reset completion notification, a system in which the malfunction occurs is reset, and therefore, the monitoring part clears a value shown in the system status 202 of the reset malfunctioning system in the cluster status management table 134 (step S911), and the processing returns to step S901 and continues the monitoring. In step S911, for example, the value shown in the column of the system status 202 is changed to "not-yet-operation", and step S911 may include a processing for clearing the reset timer, the waiting timer, and the malfunction detection computer number. On the other hand, in step S910, when it is not the reset completion notification, it means that the normal notification T851 from the monitoring part of the another system is received and therefore, the monitoring part detects that the another system is operating in the normal status (step S912), and the processing returns to step S901 and continues the monitoring. In addition, in order to detect the presence or absence of the notification of the fixed time in the judgment step S903, step S912 may include a processing for storing information relating to the time at which a normal status is received. For example, a method of recording the time may be used while conforming the system status 202 of the cluster status management table 134 to the status "normality" of the system.

In step S908, as the time set in the waiting timer, the time sufficient for all computers of the cluster system to issue the reset is set to avoid the competition of the reset. When the reset definition 135 is used, for example, "15 seconds" that is equivalent to the number of all computers×the reset interval is set while taking into consideration the system A5100 with the lowest reset priority.

FIG. 10 is a flowchart showing one example of a processing in which when the server computer malfunctions, the failover control part judges whether or not the number of malfunction computers satisfies the number of failover allowable computers as a fixed amount of resources, and the reset is performed At first, in FIG. 10, in order to judge whether or not the number of malfunction computers satisfies the number of failover allowable computers as a fixed amount of resources, the failover control part, in reference to the failover allowable computer number definition 136, judges whether or not the number of the computers shown in the malfunction detection computer number 203 of the malfunctioning computer is greater than or equal to the number of failover allowable computers (step S1001). When the number 203 does not satisfy the number of failover allowable computers, the processing goes to step S1002. The control part judges whether or not the time set in the waiting timer has elapsed, and when the time has not elapsed, the processing returns to step S1001. On the other hand, in step S1002, when the time of the waiting timer has elapsed, the processing goes to step S1003. The failover control part informs the user of the not-yet-issued reset showing that the number of failover allowable computers as a fixed amount of resources is not satisfied and the reset cannot be issued (step S1003).

The failover control part judges whether or not a forceful reset is instructed by the user (step S1004). When the forceful reset is instructed by the user, the control part executes processings in step S1008 and the subsequent steps to issue the reset. On the other hand, when the forceful reset is not instructed, the processing repeats step S1004 and waits for the input of the instruction from the user. The processing may omit step S1004 and return to step S1001.

Herein, when the responses I/Fs 1103 and 1104 from the user are not included, the processing need not wait for the instruction and therefore, may return to step S1001.

Next, in step S1001, a description will be made on a case where the malfunction detection computer number is greater than or equal to the failover allowable computer number. The processing goes to YES in step S1001, and the failover control part sets the reset timer 205 included in the cluster status management table 134 in step S1005 (step S1005). Thereafter, in the same manner as in step S911, the failover control part, in reference to the cluster status management table 134, judges whether or not the system status 202 of the malfunctioning system is cleared (step S1006).

When the system status is cleared, the reset of the malfunctioning computer is completed by another system and therefore, the failover control part returns to step S1001 and repeats the judgment step S1001 again. On the other hand, when the system status is not cleared, the control part, in reference to the cluster status management table 134, judges whether or not the time set in the reset timer has elapsed (step S1007). When the time has not elapsed, the failover control part repeats step S1006 again. On the other hand, in step S1007, when the time set in the reset timer has elapsed, the control part issues the reset request T1051 to the reset device of the malfunctioning system (step S1008). After the reset device of the malfunctioning system returns a reset success response T1052, the control part clears the system status of the malfunctioning system in the same manner as in step S911 (step S1010), and executes the failover step S1011.

Herein, in sequence diagrams and flowcharts according to the present embodiment, a description is made with a focus on operations that a malfunction of one certain system is monitored and the system is reset. When the same processing is performed also to the other systems, each part may execute the same processing in parallel, and the sequence diagrams and the flowcharts are applicable also to the above-described case.

Figure 11:
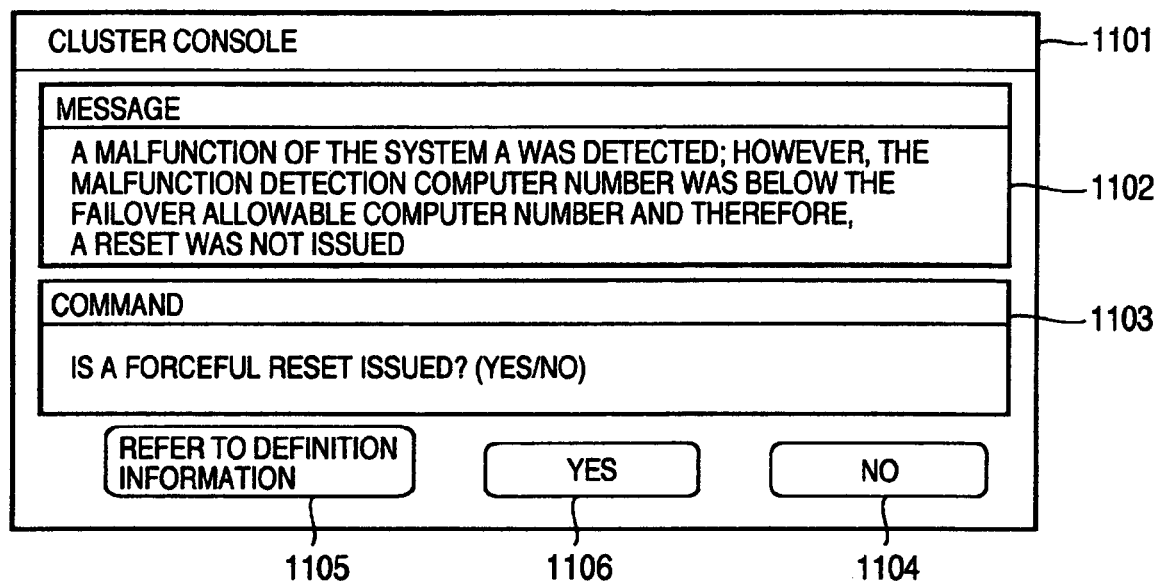
FIG. 11 shows one example of a user interface in the case of not satisfying failover allowable conditions according to the first embodiment of the present invention.

FIG. 11 is an example of the I/F which is informed to the user in step S1003. In FIG. 11, a display screen 1101 on the cluster console includes a message part 1102 that shows that the reset request cannot be issued. Further, the display screen 1101 may include the question message part 1103 that the user persuades the failover control part to instruct the reset device to forcibly perform the reset, or the response I/F to the question. As shown in FIG. 11, for example, the response I/F may be realized by the I/Fs 1103 and 1104 which can be simply selected by the user. Further, the response I/F 1105 may be included, in reference to the definition notification, as the I/F for helping responses by the user. Herein, the message part 1102 may preliminarily include a part or the whole of information capable of reference to the I/F 1105. A method of informing the user of the screen as in the I/F shown in FIG. 11 by the display via the cluster management console may be used.

Figure 12:
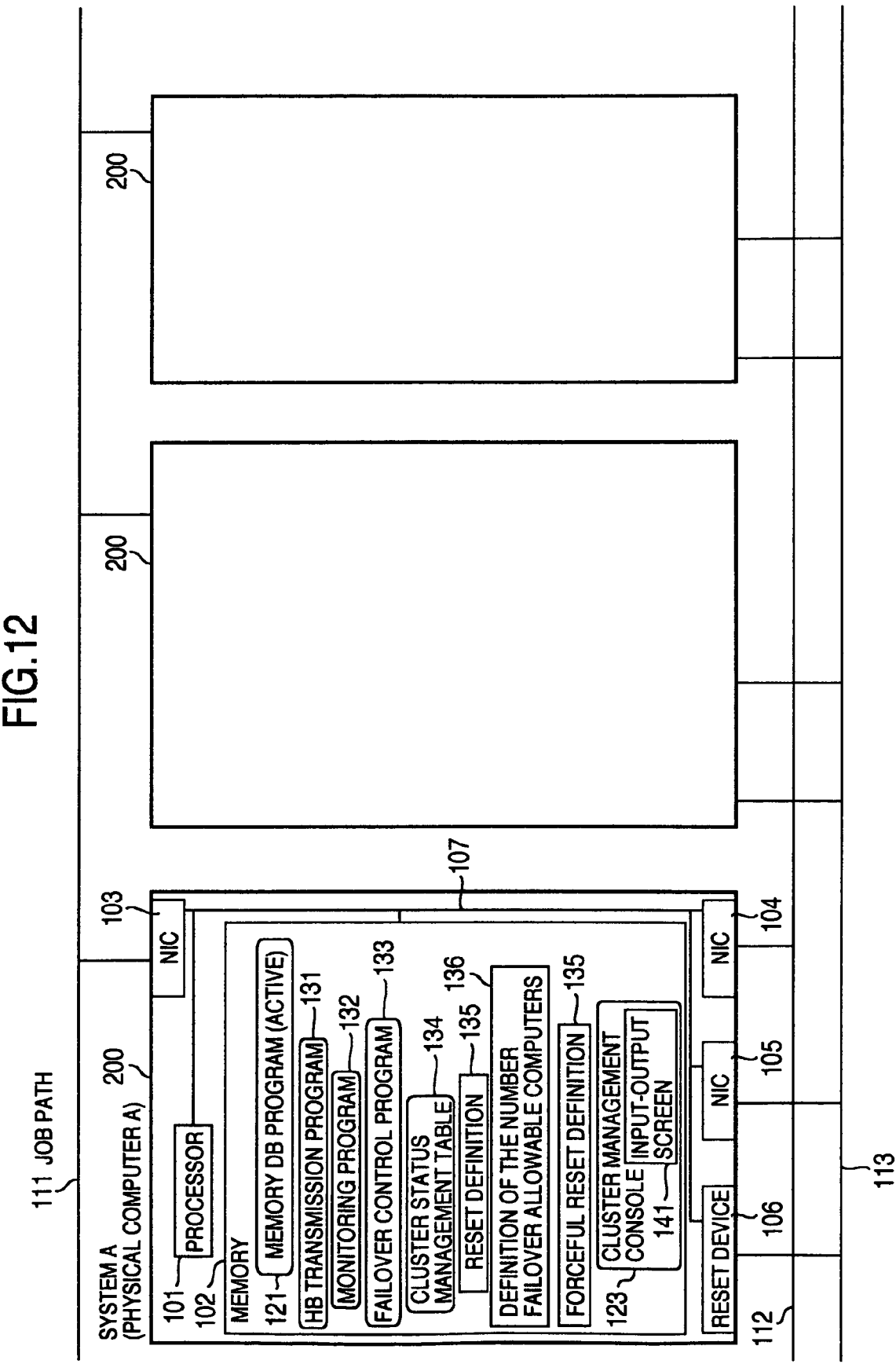
FIG. 12 is a system configuration diagram illustrating a different system configuration example according to the first embodiment of the present invention.
Figure 13:
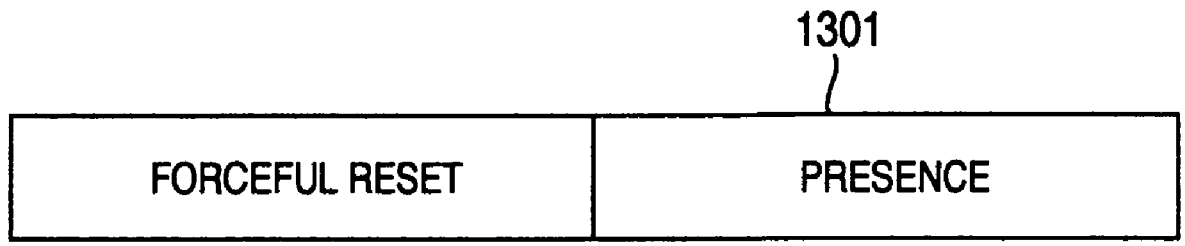
FIG. 13 shows one different example of a user interface in the case of not satisfying failover allowable conditions according to the first embodiment of the present invention.

Further, as another configuration of the I/F that the user specifies whether or not to forcibly perform the reset, the forceful reset definition 137 may be stored in the memory 102, for example, as in the configuration of the physical computer shown in FIG. 12. FIG. 13 shows a content of the forceful reset definition 137 specifying the information 1301 showing the presence or absence of the forceful reset. In the case of the above-described configuration, a method in which the notification step to the user in step S1003 is not performed may be used. Alternatively, in the case of giving the user a notification, when the not-yet reset is informed to the user, the message to the effect that the forceful reset is performed may be transmitted in place of the question message part 1103 of FIG. 11. Alternatively, there may be used a method of not inputting and outputting the message by the management console except for the message part 1102. In addition, as the configuration of FIG. 12, the hardware configuration and storage example of programs or data in the case of only one physical computer is shown; however, the other physical computers 200 and 300 may have the same configuration.

FIGS. 5 to 7 show operation sequences illustrating the relations among a plurality of systems at the time of executing the processings explained in FIGS. 8 to 10. Also according to the present embodiment and the subsequent embodiments, a description may be made using the same sequence diagrams; however, it is to be understood that these sequence diagrams related to the present invention have been simplified in processings other than the relevant processings for providing a clear understanding of the processings according to the present invention.

FIG. 5 is a sequence diagram illustrating operations that are executed at the time of satisfying the failover allowable conditions according to the first embodiment. In this diagram, in the cluster configuration shown in FIG. 1, when the definitions shown in FIGS. 3 and 4 are performed, a description will be made as one example on a case where the malfunction 511 occurs in the system A5100 as an active system server computer.

At first, when the malfunction 511 occurs in the system A5100, a normal notification (heartbeat) is interrupted with the system C5300 as a standby server computer (512). The monitoring part of the system C5300 performs the processings shown in FIG. 9, and detects the malfunction of the system A5100 to start the process 513 in the wake of the interruption of the normal notification. The detection process herein includes a processing in which the system status of the system A5100 in the cluster status management table 134 is stored to be the "malfunction". The process 513 informs the monitoring parts of the other systems that the system C5300 detects the malfunction of the system A5100 (process 514, step S905), adds one to the number of the malfunction computers in the cluster status management table, and sets a window time waiting for the other systems to detect the malfunction of the system A5100 in the waiting timer of the cluster status management table (process 516, steps S906 and S908). The waiting timer herein sets the time sufficient to issue the reset request for all server computers of the cluster system to avoid a competition of the resets. When using the reset definition 135, for example, the time "15 seconds" that is equivalent to the number of all the server computers×the reset interval is set while taking into consideration the system A5100 with the lowest reset priority.

Next, in reference to the cluster status management table 134, the failover control part of the system C5300 repeatedly executes the process to judge the following two conditions; that is, one condition is that the number of detected malfunctioning computers is greater than or equal to the number of failover allowable computers, and another condition is that the time set in the waiting timer has elapsed. After the monitoring part finishes the process 513, the judgment process (518) is executed in the process 517. Since both of the conditions are not satisfied, the processing is finished. The processes 517 and 518 correspond to those of FIG. 10.

On the other hand, at first, in the system B5200, the monitoring part that receives the malfunction notification 514 of the system A5100 executes the same processes 519 to 522 as those 513 to 516 of the system C5300, and further, the failover control part executes the same processes 522 and 523 as those 517 and 518 of the system C5300.

On the other hand, the system B5200, also when detecting the malfunction 511 of the system A5100 through the same normal notification interruption 531, executes the same processes 532 to 534, 535 and 536, 538 and 539, and 540 and 541 as those 513 to 515, 517 and 518, 519 and 520, and 522 and 523, respectively. Since the waiting timer is here set in each system, the process for setting the waiting timer is not performed.

Through a series of the above-described processes, since the malfunction detection computer number of the system A5100 is counted to be "two computers" of the systems B5200 and C5300, in the judgment processes 536 and 541, it is judged that the malfunction detection computer number is greater than or equal to the failover allowable computer number. The processes 537 and 542 (step S1005 of FIG. 10) for setting the reset timer are included and executed in the processes 535 and 540. According to the present embodiment, the time "five seconds" is set in the system B5200 and the time "zero second" is set in the system C5300, respectively.

Accordingly, since the time of the reset timer of the system C5300 has elapsed before that of the system B5200 (process 551), the failover control part of the system C5300 executes a series of the process 552 for performing the failover using the reset (steps S1007 and S1008 of FIG. 10).

In the process 552, the failover control part of the system C5300 detects the elapse of the time of the reset timer in reference to the cluster status management table (553), and requests the reset to the reset device of the malfunctioning system A5100 (554). After the reset device resets the system A5100 (555), the failover control part of the system C5300 executes the process (process 556) for receiving the notification of the reset success. After the reception, the failover control part of the system C5300 informs the monitoring parts of the other systems in the cluster system that the system C5300 completes the reset of the system A5100 (process 557), clears from the cluster status management table the information on the system A5100 in which the reset is completed (process 558), and executes the failover process 559.

On the other hand, in the same manner as in the process 558, the system B5200, when receiving the notification 557, executes the process 560 including the process 561 for clearing the information of the system A5100 (steps S901, S910, and S911 of FIG. 9). Thereby, the reset timer set in the system B5200 is cleared, and therefore, the reset from the system B5200 does not occur. Herein, the failover process 559 may include the failover process such that the operation is performed cooperatively with the system B5200 as the other systems. As the failover process to be operated cooperatively, for example, there may be used the failover process in which the system C5300 is not determined as the failover destination, but the system B5200 is determined as the failover destination.

As described above, through a series of the processes shown in FIG. 5, when a certain system malfunctions, a reset request can be performed from the other systems and the failover process can be realized.

FIG. 6 is a sequence diagram illustrating operations executed at the time of satisfying the failover allowable conditions according to the first embodiment of the present invention. This operation is an operation caused in the case where there occurs the malfunction such that the system C5300 cannot perform the heartbeat with the other systems. Also, the operation shows an operation in the case where the malfunction notification from the other systems is not received but the reset is performed from the other systems. Examples of the above-described malfunction include the malfunction 611 in the monitoring path NIC of the system C5300 and the malfunction in the HB transmitting part of the system C5300. In the example, the former case will be described as one example.

At first, in the same manner as in FIG. 5, the system C5300 executes the processes 512 to 518 including the malfunction detection of the system A5100, which correspond to steps S901 to S908 in FIG. 9 and steps S1001 to S1007 in FIG. 10. In addition, the difference from FIG. 5 is that the malfunction notification 514 to the system A5100 is not informed to the other systems by the malfunction 611.

On the other hand, the systems A5100 and B5200 are normally operating and therefore, in the same manner as in the processes 512 to 523 and 531 to 542, the systems A5100 and B5200 executes the processes 631 to 642 and 651 to 662, which correspond to steps S901 to S908 of FIG. 9, and steps S1001 to S1007 and S1008 to S1010 of FIG. 10. In this connection, in the processes 657 and 660 for setting the reset timer in the systems A5100 and B5200, the times "10 seconds" and "5 seconds" are set according to the reset priority of each system. Values of the reset timer set in the systems A5100 and B5200 are smaller than that of the waiting timer in the system C5300. Therefore, this ensures that the time of the reset timer of the system that is normally operating has elapsed precedent to the malfunctioning system. Accordingly, in the system B5200 with the smaller reset priority, the time of the reset timer has elapsed (process 671). The systems A5100 and B5200 execute the processes 672 to 681 for the system C5300, in the same manner as in the processes 552 to 561 that are executed for the system A5100 by the systems B5200 and C5300. In addition, the failover process 679, when detecting that an active server computer exists in the system A5100, may include a process in which an operation of switching the active server computer into the system B5200 is not performed. In this case, the failover is not performed and step S1011 is not executed.

As described above, through a series of processes shown in FIG. 6, when the systems A5100 and B5200 are normally operating, the system C5300 does not reset the systems A5100 and B5200. On the contrary, the systems A5100 and B5200 can reset the system C5300, and prevent the failover causing performance degradation.

FIG. 7 is a sequence diagram illustrating a different example of processings that are executed at the time of not satisfying the failover allowable conditions according to the first embodiment of the present invention. In the same manner as in FIG. 6, also, this diagram shows an operation caused in a case where there occurs a malfunction such that the system C5300 cannot perform the heartbeat with the other systems. However, this diagram shows an operation in a case where the time set in the waiting timer has elapsed without resetting from the other systems. Examples of the above-described malfunction include a case where the malfunctions 711 and 712 occur in both of the systems A5100 and B5200, and a case where there occurs a multiple malfunction such that a malfunction occurs between the NIC malfunction for the monitoring path in the system C5300 and any one of the systems A5100 and B5200. In this example, the former case will be described as one example.

At first, in the same manner as in FIG. 6, the system C5300 executes the processes 512 to 518 including the malfunction detection in the system A5100, which correspond to steps S901 to S908 of FIG. 9 and steps S1001 to S1007 of FIG. 10. Thereafter, since the systems A5100 and B5200 malfunction, the system C5300 is not reset. Therefore, the time of the waiting timer set in the process 516 has elapsed (process 621), and the failover control part executes the process 622. In the process 622, in reference to the cluster status management table, the elapse of the time of the waiting timer is detected (process 623 and step S1002 of FIG. 10) and the malfunction detection computer number does not satisfy the failover allowable computer number as the failover conditions. Therefore, the process 622 includes a process (process 724 and step S1003 of FIG. 10) for informing the cluster management console that the reset is not issued. The management console that receives the notification executes the process 725 for the user. In the process 725, the notification contents of the process 724 are displayed to the user (process 726). In addition, the process 726 may include the process 727 for receiving from the user the instruction of whether or not the reset to the system A5100 is forcibly executed. When the instruction is received from the user, processings in the process 728 and the subsequent processes are executed by the cluster management console and the failover control part. At first, the management console instructs the failover control part to execute the forceful reset of the system A5100 (process 728 and step S1004 of FIG. 10). In the wake of the instruction, the failover control part executes the processes 729 to 734 for resetting the system A5100 and for performing a failover (step S1008 of FIG. 10) in the same manner as in the processes 554 to 559. However, the difference from FIG. 5 is that a notification 732 of reset completion of the system A5100 is not informed to the other systems owing to the malfunction 712.

In the same manner as in FIGS. 5 and 6, in FIG. 7, there is described only a sequence showing only an operation of the failover with the reset to the system A5100 corresponding to the malfunction 711 of the system B5200. However, the operation of the failover with the reset to the system B5200 corresponding to the malfunction 712 of the system B5200 is similarly performed in some cases.

As described above, through a series of the processes shown in FIG. 7, there is provided the I/F that the user can know a case where a failover using the reset is not performed. At the same time, according to the instruction of the user, in case the system A5100 of an active server computer malfunctions, a reset is performed even if causing the performance degradation such that a task stopping status due to the malfunction is not continued, thereby performing the failover.

According to the first embodiment shown in FIGS. 1 to 13, as described above, the number of systems that detect the malfunctioning systems and that are normally operating is managed, it is judged whether or not the number of the malfunctioning systems satisfy the number of failover allowable computers, and the failover using the reset is controlled. Thereby, when the active server computer maintains the performance in the cluster configuration having computers in number of the failover allowable computers and in normally operating, the malfunctioning system that does not belong to the cluster configuration can be reset. Therefore, there can be prevented the failover that the performance cannot be maintained even if performing the failover after the reset.

Further, when the failover allowable computer number is not satisfied, a notification that the reset is not yet performed can be informed to the user. In that case, the user can instruct the malfunctioning system to perform the forceful reset and allow the other systems to perform the failover using the reset. Therefore, the failover of a system that cannot maintain the performance can also be executed based on the judgment of the user.

Second Embodiment

FIGS. 14 to 23 show a second embodiment of the present invention, and the second embodiment is realized by changing a part of the first embodiment.

Figure 14:
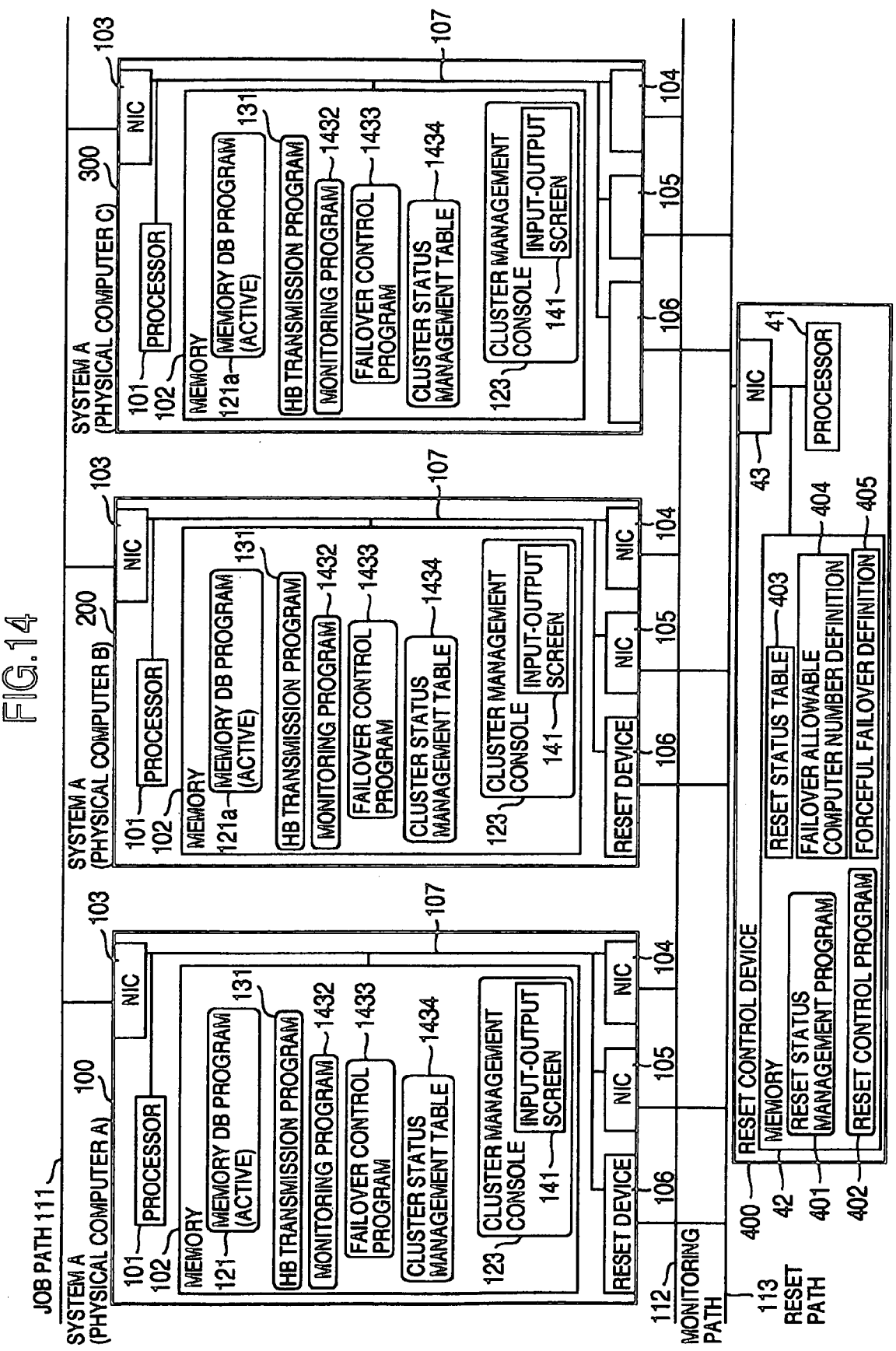
FIG. 14 is a system configuration diagram according to a second embodiment of the present invention.

FIG. 14 is a block diagram illustrating a configuration of a cluster system according to the second embodiment, and is obtained by changing a part of the block diagram according to the first embodiment shown in FIG. 1.

FIG. 14 is different from FIG. 1 in that a reset control device 400 is connected with a reset path 113.

A memory 121 of the physical computer stores the HB transmission program 131, a monitoring program 1432, and a failover control program 1433, in the same manner as in the first embodiment. Herein, both of the second and third programs will be described in detail below with reference to sequence diagrams and flowcharts, and operations different from those of the first embodiment are performed.

The monitoring program 1432 is executed by the processor, and configures the monitoring part that manages a malfunction status of a certain system using a cluster status management table 1434 shown in FIG. 15 to detect a malfunction. When the failover control program 1433 is executed by the processor, and configures the failover control part that instructs the reset control device to perform a reset of the malfunctioning system via the reset path when detecting the malfunction. FIG. 15 shows the cluster status management table. The table of FIG. 15 includes the same system identifier 201 and system status 202 as information held by the cluster management table 134 according to the first embodiment.

The reset control device 400 includes a NIC 43, a processor 41, and a memory 42. In the same manner as in the physical computer 100, the processor 41 executes a program stored in the memory 42 to thereby execute various processings. The NIC 43 communicates with the reset device 106 within each physical computer via the reset path 113 as a network. In addition, the processor 41 has a plurality of cores, and may execute a plurality of processings in parallel. The memory 42 stores the reset status management program and the reset control program. Further, in this example, an example where the reset control device has the same configuration as that of the physical computer is shown; further, the reset control device may be configured by one or more operational equipments that executes the same processing as that of a case where the processor 41 executes each program stored in the memory 42.

The memory 42 has a reset status management program 401 and reset control program 402 executed by the processor 41. Further, the memory 42 has a reset status table 403, a failover allowable computer number definition 404, and a forceful failover definition 405.

The processor 41 of the reset control device 400 executes the reset status management program 401, and configures a reset status management part 101 that manages a status of a reset request from each system using the reset status table 403. Further, the processor 41 of the reset control device 400, when executing the reset control program, configures the reset control part 401 that performs a process for issuing a reset requested from each system using the failover allowable computer number definition 404 as same as the failover allowable computer number definition 136. The memory 42 may further include the same forceful reset definition 405 as the definition 137.

As shown in FIG. 16, the reset status table has a malfunctioning system identifier 1601 representing a system of a reset request destination, the number of malfunction detection computers 1602 representing how many computers issue the reset request to the malfunctioning system, and a malfunction detection source identifier 1603 representing a system of the reset request source. Here, the identifier 1603 has a function of collectively recording the order received by the reset control device, and information is held in the order corresponding to the reset request from the head of the table, for example, in FIG. 16.

FIGS. 20 to 23 show diagrams showing one example of flowcharts relating to the malfunction detection process and the reset issuance control process. In addition, an operation diagram of the HB transmitting part is the same as the diagram 8 according to the first embodiment.

Figure 20:
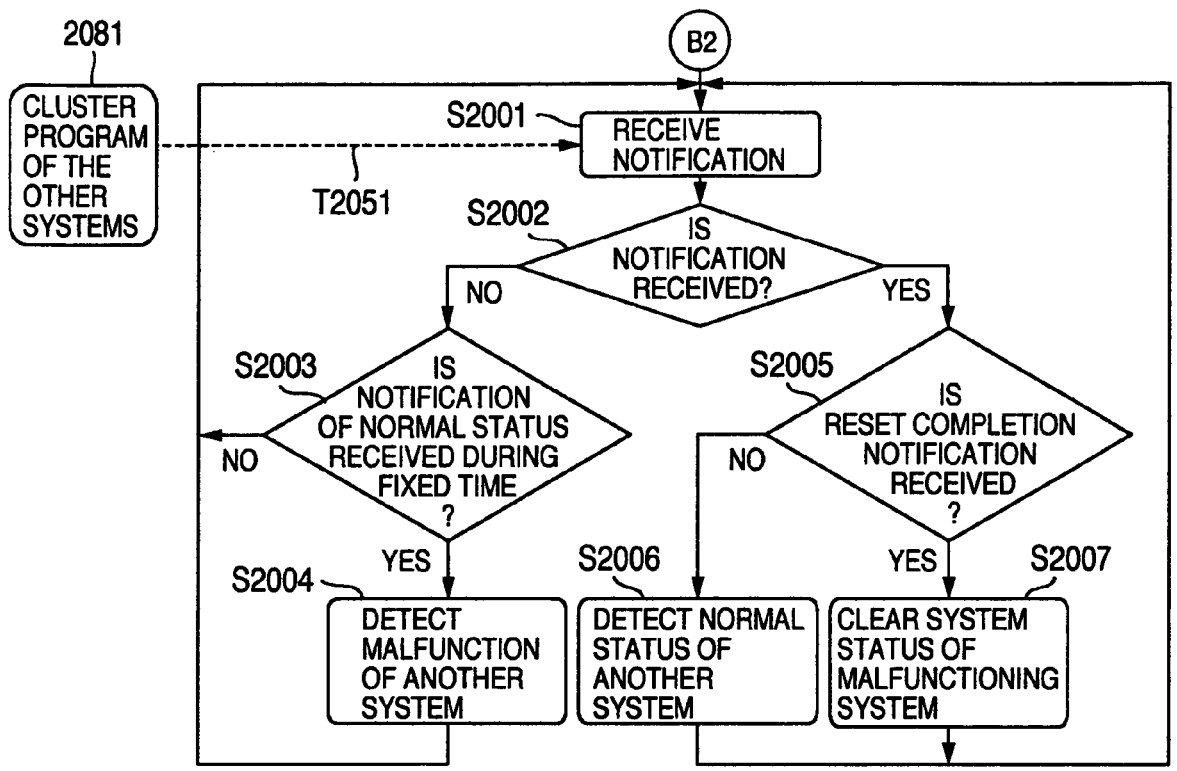
FIG. 20 is a flowchart showing one example of a processing for monitoring a malfunction according to the second embodiment of the present invention.

FIG. 20 is a flowchart showing one example of a processing in which the monitoring part monitors a malfunction and which is performed by the part based on the monitoring results. At first, in FIG. 20, the monitoring part executes steps S2001 to S2004, and steps S2005 to S2007 in the same manner as in steps S901 to S904, and steps S910 to S912 of FIG. 9. A difference from the first embodiment is as follows. At first, in step S2004, a system status 202 of the cluster status management table 1434 is changed into the "malfunction" by the malfunction detection of another system, and the processing returns to step S2001. Next, when a communication is received in step S2002 is judged, the monitoring part judges whether or not the reset completion notification is received (step S2005). Further, in step S2007, when a system status of the malfunctioning system is cleared, the monitoring part changes the system status of the management table 1434 into "not-yet-operation", and the processing returns to step S2001.

Figure 21:
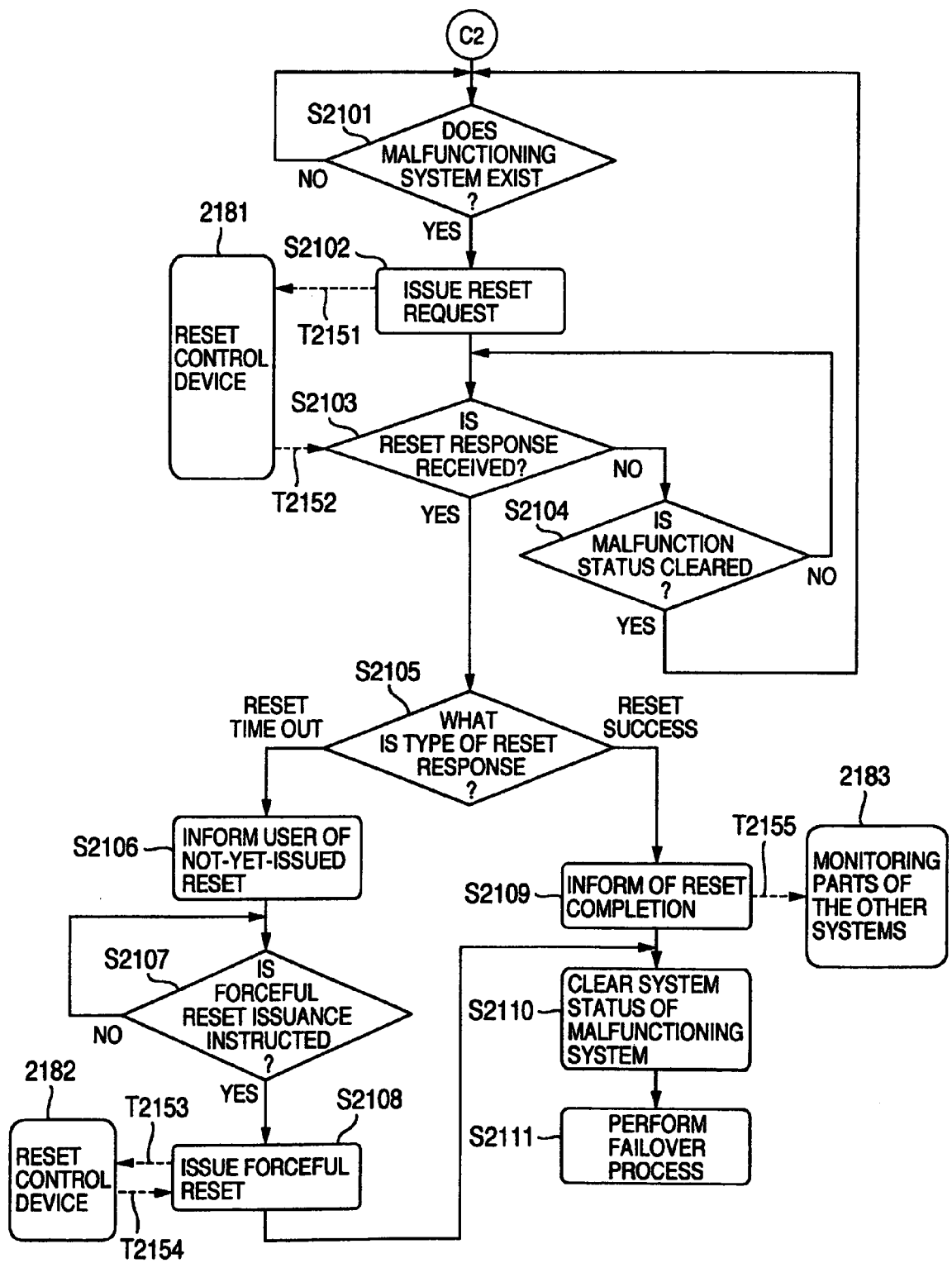
FIG. 21 is a flowchart showing one example of a processing for performing a reset request at the time of detecting a malfunction according to the second embodiment of the present invention.

FIG. 21 is a flowchart showing one example of a processing in which the failover control part issues the reset request to the reset control device at the time of the malfunction of the malfunctioning computer.

At first, in FIG. 21, the failover control part judges whether or not the malfunctioning system detected in step S2004 exists (step S2101). When the malfunctioning system does not exist, the processing repeatedly performs step S2101. On the other hand, when the malfunctioning system exists, the failover control part issues the reset request T2151 to the reset control device 2181 (step S2102). After the issuance of the reset request, the failover control part judges whether or not the reset response T2152 is received. When the response T2152 is not received, the monitoring part judges whether or not the malfunction status is cleared in step S2007 (step S2104). As a result of the judgment, when the malfunction status is not cleared, the malfunctioning system is not reset. Therefore, the failover control part returns to step S2103, and repeats the reception confirmation process of the reset response. On the other hand, when the malfunction status is cleared in step S2104, the malfunctioning system is reset by the reset from another system. Therefore, the failover control part returns to step S2101, and continues the process for judging another malfunctioning system.

On the other hand, in step S2103, the failover control part, when receiving the reset response, judges a type of the reset response (step S2105). When the reset response is a reset success, the failover control part executes steps S2109 to S2111 in the same manner as in steps S1009 to S1011 of FIG. 10, and informs the monitoring parts 2183 of the other systems of the reset completion notification T2155 and performs the failover process S2111.

Further, in step S2105, the case where a content of the reset response is a reset time out notification is a case where the number of failover allowable computers as a fixed amount of resources is not satisfied and the reset control device cannot issue the reset. Accordingly, in the same manner as in steps S1003, S1004, and S1008 of FIG. 10, the failover control part outputs a GUI as shown in FIG. 11 (step S2106), waits for an issuance instruction of the forceful reset from the user, and when the issuance instruction is received, performs the reset forceful issuance (steps S2107 and S2108). In steps S2107 and S2108, in the same manner as in the first embodiment, whether or not the forceful reset is OK may be preliminarily defined including the forceful reset definition 405.

Figure 22:
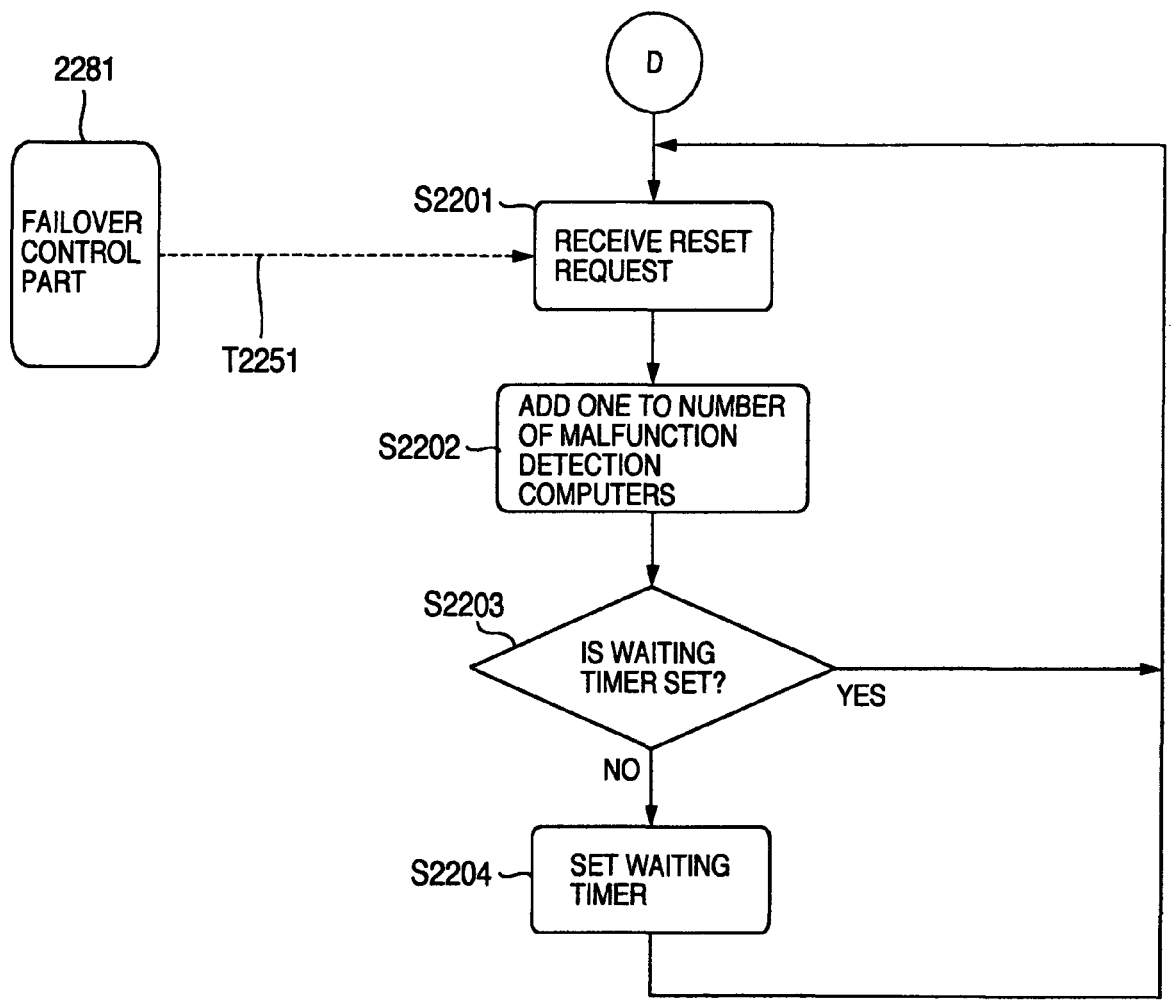
FIG. 22 is a flowchart showing one example of a processing in which a reset status is managed by a reset device that receives a reset request according to the second embodiment of the present invention.

FIG. 22 shows one example of a process in which the reset status management part of the reset control device manages the malfunction detection computer number based on the reset request received from each system.

At first, the reset status management part receives the reset request 2251 from the failover control part (step S2201), and adds +1 to the count of the malfunction detection computer number 1602 in the reset status table 403 (step S2202). Further, along with the addition of the count of the malfunction detection computer number, an identifier identifying a system in which the reset request to the system A5100 is issued, the issuance time, the order, and the issuance order among a plurality of systems are stored. Next, to judge whether or not the malfunction is already detected, the reset status management part judges whether or not the waiting timer is set (step S2203). As a result of the judgment, when the waiting timer is already set, the reset status management part directly returns to step S2201. On the other hand, when the waiting timer is not yet set, the reset status management part sets the waiting timer (step S2204), and then returns to step S2201 to continue the monitoring.

Figure 23:
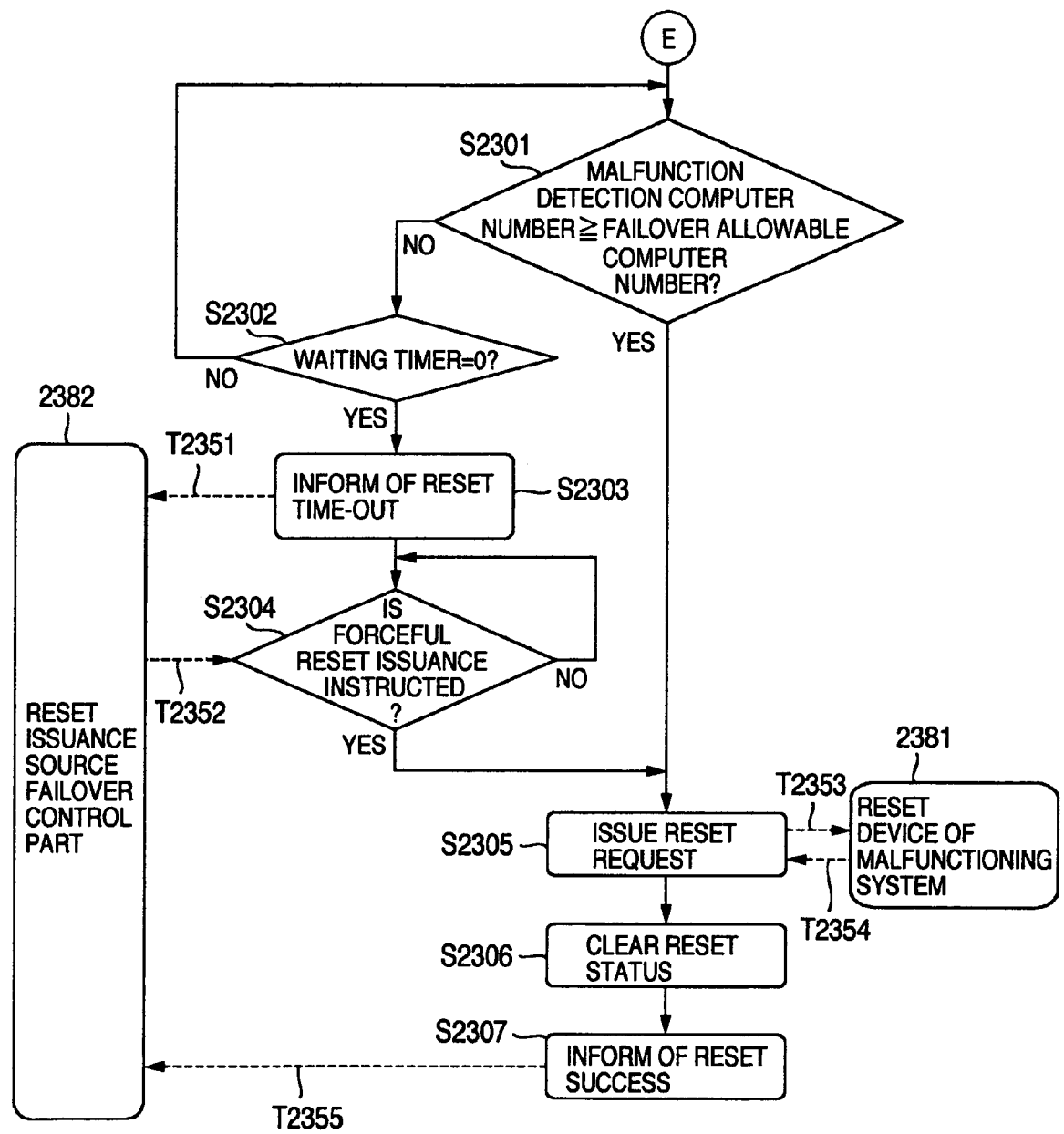
FIG. 23 is a flowchart showing one example of a processing in which a reset is performed by a reset device that receives a reset request according to the second embodiment of the present invention.

FIG. 23 shows one example of a process in which the reset control part of the reset control device judges whether or not the number of malfunction detection computers satisfies the number of failover allowable computers as a fixed amount of resources based on the reset request received from each system, and executes the reset.

At first, the reset control part executes the same steps S2301 and S2302 as steps S1001 and S1002 of FIG. 10 by using the reset status table 403 and the failover allowable computer number definition 404 in place of the cluster status management table 134 and the failover allowable computer number definition 136. When the time set in the waiting timer in step S2302 has elapsed, the reset control part informs the reset issuance source of the reset time out notification T2351 as an execution opportunity of the processings in step S2106 and the subsequent steps (step S2303). When a plurality of reset issuance sources exist, in reference to the reset status table, the reset control part informs the failover control part 2382 of the reset issuance source of which the reset issuance order is earliest based on the reset status table. In step S2108, the reset control part judges whether or not the reset forceful issuance instruction T2352 is received (step S2304). When the reset forceful issuance instruction T2352 is received, the reset control part executes the processings in the reset issuance step S2305 and the subsequent steps. On the other hand, when the reset forceful issuance instruction T2352 is not issued, the reset control part repeats step S2304 in order to wait for the instruction in the same manner as in the forceful reset instruction waiting in step S1004.

On the other hand, in step S2301, when the malfunction detection computer number is greater than or equal to the failover allowable computer number, the reset control part executes step S2305 for issuing the reset T2353 to the reset device 2381 of the malfunctioning system and for receiving the reset success response T2356. Continuously, after clearing the reset status (step S2306), in reference to the reset status table, the reset control part executes step S2307 in which the reset control part informs the failover control part 2382 of the reset issuance source in which the reset issuance order is earliest based on the reset status table of the same reset success notification T2355 as the notification T2152 or T2154.

Figure 17:
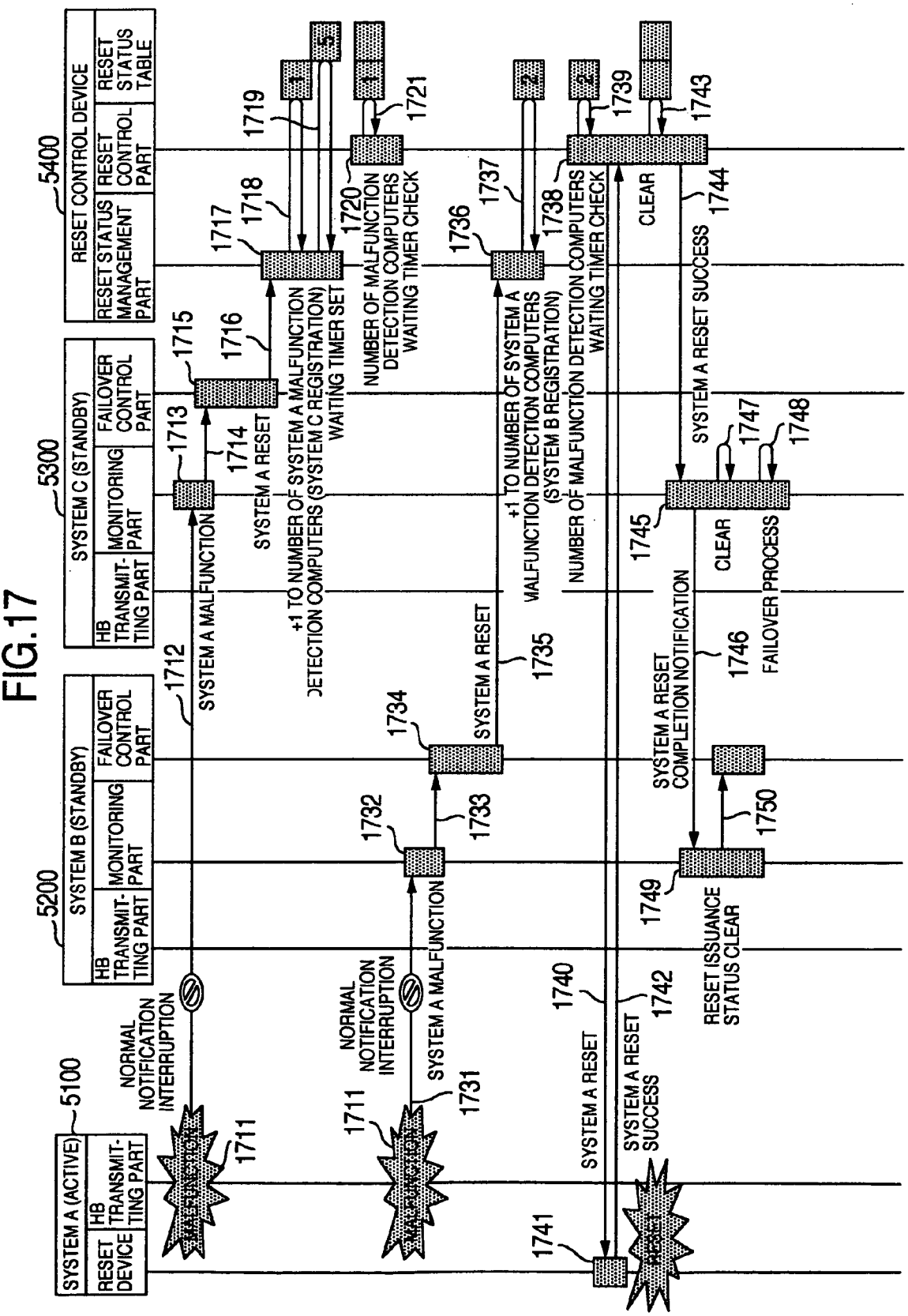
FIG. 17 is a sequence diagram illustrating one example of a processing that is performed in the case of satisfying failover allowable conditions according to the second embodiment of the present invention.
Figure 18:
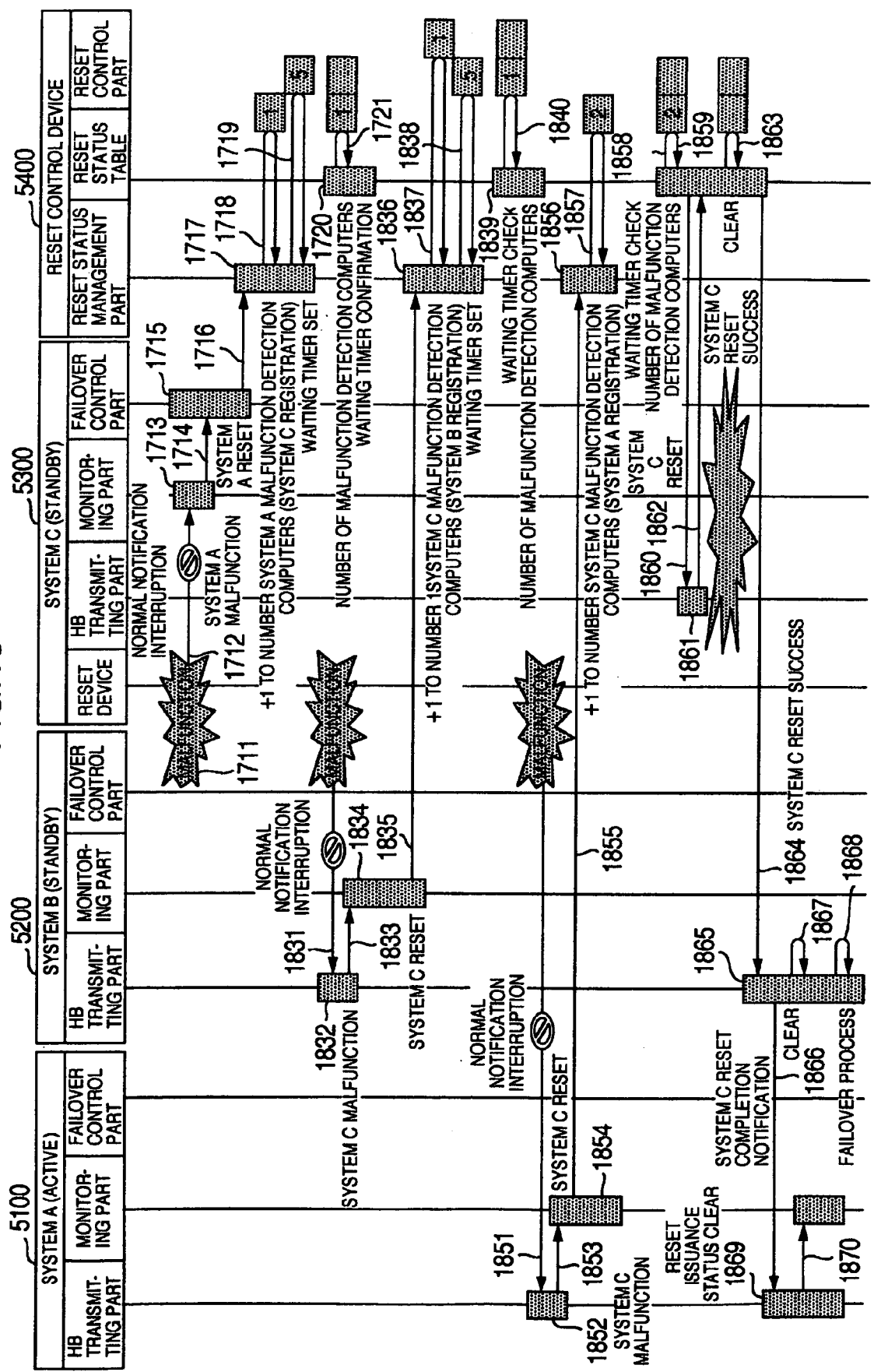
FIG. 18 is a sequence diagram illustrating one example of a processing that is performed in the case of not satisfying failover allowable conditions according to the second embodiment of the present invention.
Figure 19:
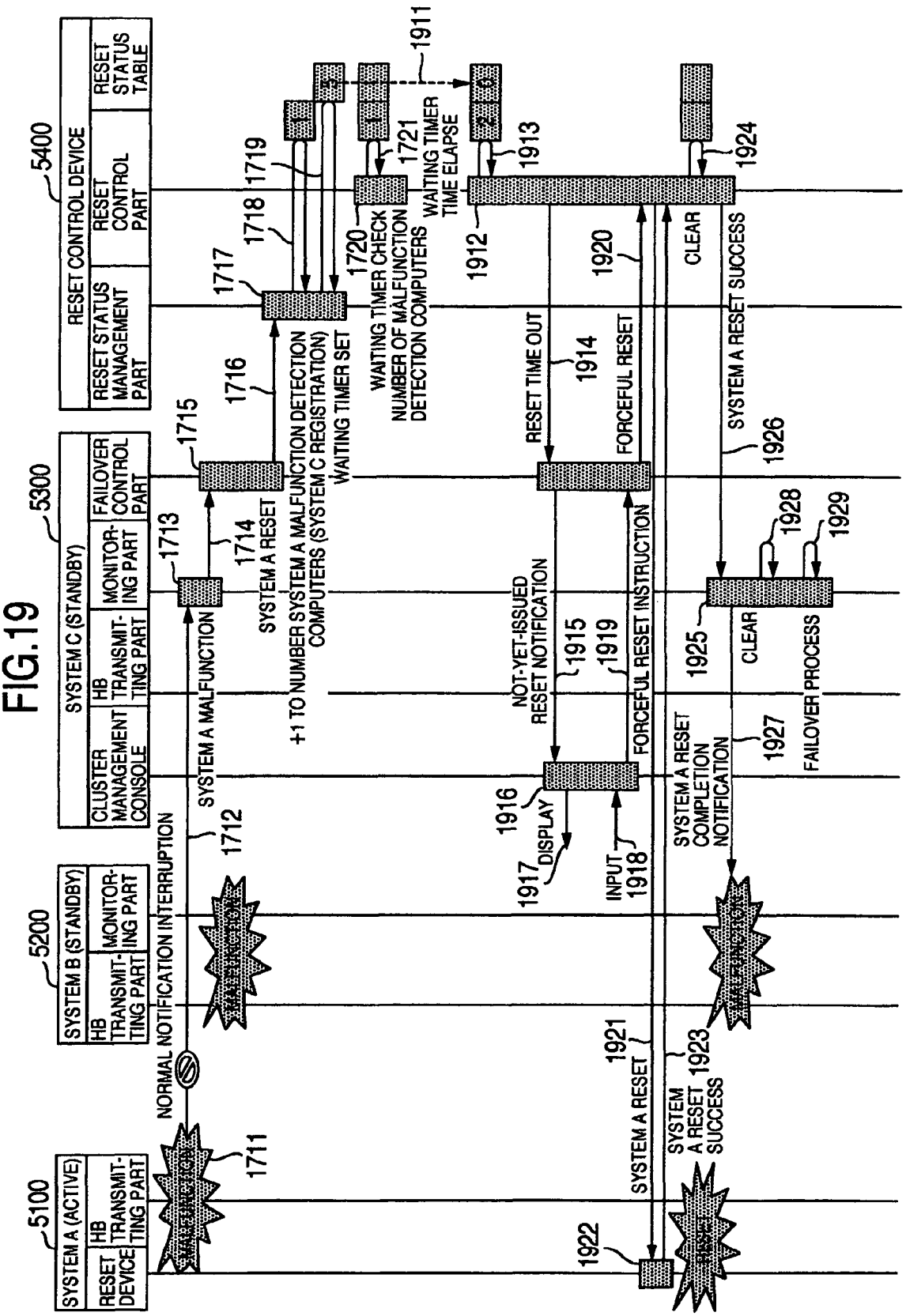
FIG. 19 is a sequence diagram illustrating one different example of a processing that is performed in the case of not satisfying failover allowable conditions according to the second embodiment of the present invention.

FIGS. 17 to 19 show a simple operation sequence representing a processing outline according to the second embodiment at the time of executing flowcharts of FIGS. 20 to 23. In the malfunction as an object of each diagram, FIGS. 17 to 19 correspond to sequence diagrams 7 to 9 according to the first embodiment, respectively, and are realized by changing a part of each sequence diagram to be executed.

FIG. 17 is a sequence diagram illustrating operations that are executed in the case of satisfying the failover allowable conditions according to the second embodiment of the present invention. The processes 1717 to 1719, 1736, and 1737 correspond to steps of the flowchart in FIG. 22. The processes 1720, and 1738 to 1744 correspond to steps of the flowchart in FIG. 23. The processes 1713, 1714, and 1745 to 1748 correspond to steps of a part of the flowcharts in FIGS. 20 and 21. The processes 1749 and 1750 correspond to steps of a part of the flowchart in FIG. 20.

At first, when a malfunction 1711 occurs in the system A5100, a monitoring part 1432 detects a normal notification interruption 1712 from the system A5100 in the system C5300. In the wake of the detection, the monitoring part 1432 detects the malfunction of the system A5100 and starts the process 1713. The process 1713 includes the process 1714 for informing the failover control part 1433 of the malfunction in the system A5100. By the notification, the failover control part executes the process 1715 including the process 1716 for requesting a reset of the system A5100 to the reset control device.

In a reset control device 5400, the reset status management part 401, when receiving the reset request, executes the process 1717 (step of FIG. 22). In the process 1717, the reset status management part executes the processes 1718 and 1719 using the reset status table in the same manner as in the processes 515 and 516. In the same manner as in the process 515, the process 1718 here includes a processing for storing a system in which a reset request to the system A5100 is issued, and also an issuance order in addition to the malfunction detection computer number. Next, in the reset control device 5400, in the same manner as in the processes 517 and 518 that are executed in FIG. 5 using the cluster status management table 134 by the failover control part 133 of the system C5300, the reset control part 402 judges two conditions of the number of malfunction detection computers and the waiting timer using the reset status table 403 in the processes 1720 and 1721. Since the conditions are not satisfied, the processing is finished (steps S2301 and S2302 of FIG. 23). In the same manner, these processings are also repeatedly executed by the reset control part.

On the other hand, in the malfunction 1711 of the system A5100, which is detected also in the system B5200 in the same manner as in FIG. 5, the processes 1731 to 1737, 1738, and 1739 are executed, respectively, in the same manner as in the processes 1712 to 1718, 1720, and 1721 (corresponding to each step of FIG. 23).

Through a series of the processes, in the reset control device 5400, the waiting timer is not set, since being set in the process 1719 (corresponding to each step of FIG. 22).

In the process 1737, since the malfunction detection computer number in the system A5100 is "two computers", the reset control part judges that the number is greater than or equal to the failover allowable computer number in the judgment process 1739. The reset control part requests the reset to the reset device of the malfunctioning system A5100 (process 1740), and receives a notification of a reset success (process 1742, and step S2305 of FIG. 23) after the reset device resets the system A5100 (process 1741). After the process 1742, the reset control part executes the process 1743 for clearing the information of the system A5100 in which the reset is completed, and based on the reset status table, executes the process 1744 for informing of the reset success the system C5300 in which the reset request of the system A5100 is first performed.

In the system C5300, the monitoring part, when receiving the reset success notification, executes the process 1745 as a response for the reset request process 1716. In the process 1745, the monitoring part informs the monitoring parts of the other systems that the system C5300 completes the reset of the system A5100 (process 1746), executes the process 1747 for clearing the information of the system A5100, and executes the failover process 1748 (each step of FIG. 21). The processes 1745 to 1748 correspond to steps of S2103, S2105, and S2109 to S2111 of FIG. 21.

On the other hand, in the same manner as in the process 1745, the monitoring part of the system B5200, after receiving the notification 1746, executes the process 1749 including the process 1750 for clearing the information of the system A5100 (each step of FIG. 21). In the same manner as in the process 561, the failover process 1748 may here include a failover process in which an operation is performed cooperatively with the system B5200 of the other systems.

As described above, through a series of the processes shown in FIG. 17, when a certain system is malfunctioning, a reset can be performed from the other systems and a failover process can be realized.

FIG. 18 is a sequence diagram illustrating operations that are executed in the case of satisfying the failover allowable conditions according to the second embodiment of the present invention.

At first, in the same manner as in FIG. 17, the processes 1711 to 1720 including the malfunction detection of the system A5100 are executed in the system C5300 and the reset control device 5400. On the other hand, the systems A5100 and B5200 are normally operating in the same manner as in FIG. 6. Therefore, the processes 1831 to 1840, and 1851 to 1859 are executed in the same manner as in the processes 1712 to 1721, and 1731 to 1739. As a result, before the time of the waiting timer for the system A5100 has elapsed through the process 1719, the number of malfunction detection computers of the system C5300 becomes "two computers" through the process 1859. The reset process of the system C5300 by the reset device, and a series of the processes 1860 to 1870 including the processes of the systems A5100 and B5200 are executed in the same manner as in the processes 1740 to 1750. The failover process 1868 may here include the process in which the active computer is not switched to the system B5200 in the same manner as in the failover process 679 of FIG. 6.

As described above, through a series of the processes shown in FIG. 18, when the systems A5100 and B5200 are normally operating, the system C5300 does not reset the systems A5100 and B5200. However, the system C5300 can be reset by the systems A5100 and B5200, and therefore, the failover causing the performance degradation can be prevented.

FIG. 19 is a sequence diagram illustrating one different example of processings that are executed in the case of not satisfying the failover allowable conditions according to the second embodiment of the present invention.

At first, in the system C5300, the processes 1712 to 1721 including the malfunction detection of the system A5100 are executed in the same manner as in FIG. 17. Thereafter, in the same manner as in FIG. 7, since the systems A5100 and B5200 are malfunctioning, the reset request from the system C5300 is not received by the reset control device 5400. Therefore, the time of the waiting timer set in the process 1719 has elapsed (process 1911), and the reset control part of the reset control device 5400 executes the process 1912.

In the process 1912, the reset control part, in reference to the reset status table, detects the elapse of the time of the waiting timer (process 1913). Since the number of malfunction detection computers does not satisfy the number of failover allowable computers as the failover conditions, the reset control part informs the failover control part of the system C5300 as an issuance source of the reset request that the reset is not issued and the time is out (process 1914). The failover control part that receives the notification executes the processes 1915 to 1919 in the same manner as in the processes 724 to 728. Further, a series of the processes includes the process for using the forceful reset definition 405 of the reset control device 5400 in the same manner as in the process for using the forceful reset definition 137 according to the first embodiment. Thus, the notification I/F and the instruction I/F to/from the user can be provided in the same manner as in the first embodiment.

The failover control part, when receiving the forceful reset instruction 1919, issues the forceful reset to the reset control device (process 1920). The reset control device 5400, when receiving the forceful reset, executes the processes 1921 to 1929 for resetting the system A5100 to perform the failover in the same manner as in the processes 1740 to 1748.

As described above, through a series of the processes shown in FIG. 19, provided is the I/F in which the user can know that the failover using the reset is not performed. At the same time, based on the instruction from the user, when the system A5100 of the active computer malfunctions, the reset is performed even if causing the performance degradation such that a task stopping status due to the malfunction is not continued, thereby performing the failover.

Herein, in the same manner as in the first embodiment, the sequence diagrams and flowcharts according to the second embodiment are also described with a focus on the operations in which the malfunction in one certain system is monitored and the system is reset. Since the same processes are performed also to the other systems, each part may execute the same processes in parallel, and the sequence diagrams and the flowcharts are applicable also to the above-described case.

As a result, according to the second embodiment shown in FIGS. 14 to 23, the number of systems that detect system statuses and that are normally operating is managed, it is judged whether or not the number of malfunction detection computers satisfies the number of failover allowable computers, and the failover of each computer is controlled through the control of the reset execution due to the malfunction in the reset device that receives the reset issuance from each computer and that resets each computer, thereby obtaining the same effects as those of the first embodiment.

Third Embodiment

FIGS. 24 to 29 are diagrams illustrating a third embodiment of the present invention, and the first embodiment is partially changed and performed to thereby realize the third embodiment.

Figure 24:
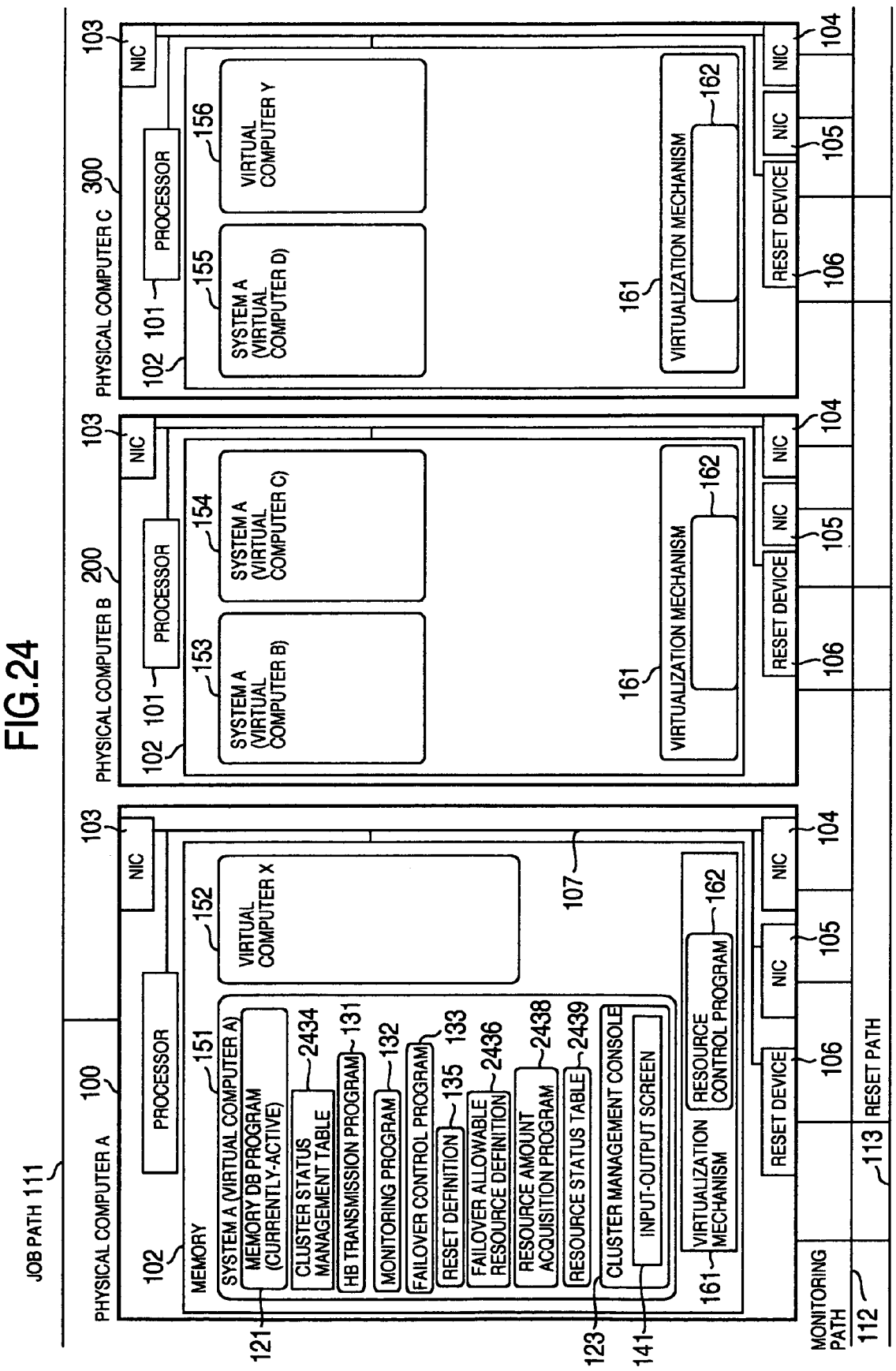
FIG. 24 is a system configuration diagram according to a third embodiment of the present invention.

FIG. 24 is a block diagram illustrating a configuration of a cluster system according to a third embodiment of the present invention. The block diagram of FIG. 24 is obtained by changing a part of the block diagram shown in FIG. 1 according to the first embodiment.

A computer shown in FIG. 24 has the following functions.

At first, a virtualization mechanism 161 is stored in the memory 102, and executed by the processor 101. Further, when resources of the memory 102, processor 101, and NICs 103, 104, and 105 of the physical computer 100 are allocated by the virtualization mechanism, virtual computers 151 and 152 have the same functions as those of the physical computer. Thereby, each virtual computer operates in the same manner as in the case where the memory DB program 121, each program, and the cluster management console are stored in the physical computer. Based on the setting value, the resource control program 162 stored in the virtualization mechanism is a program for determining the used amount of resources which are used by the virtual computer. When the processor 101 executes the program 162, the resource control part is configured by the program 162. The resource control part here generates and deletes the virtual computer. In addition, the setting value can be specified from the outside, for example, from another physical computer or a virtual computer including setting objects. In addition, the resource control part can refer, from the outside, to information on how resources of the physical computer are used for each virtual computer. Further, the communication between the virtual computers on the same physical computer is not required to be performed through the NICs of the physical computer, for example, the communication may be performed using copies between the memories via the virtualization mechanism. Therefore, in the virtual computer, an HB malfunction is detected, in some cases, due to a malfunction of each device for realizing the above-described method, for example, a malfunction of the virtualization mechanism or the memories.

Next, the memory 102 has a cluster status management table 2434 obtained by partially changing the table 134 of FIG. 1, and further, a failover allowable resource definition 2436, a resource amount acquisition part 2438, and a resource status table 2439.

As shown in FIG. 25, the cluster status management table 2434 has a malfunction detection source identifier 2501 in addition to the same system identifier 201, system status 202, the number of malfunction detection computers 203, and waiting timer 204 as those of the cluster status management table 134. As the malfunction detection source identifier, a system in which a system shown by the system identifier is detected to malfunction, and its order information are stored based on the recognition of its own computer, for example, the system and the notification are stored from the head of the table in the order corresponding to the detection in FIG. 25.

As shown in FIG. 26, in the failover allowable resource definition 2436, stored is the allowable resource amount 2602 for each type of resources 2601 showing the resource amount required for the memory DB program as an application program to maintain the performance and operate.

The resource amount acquisition program 2438 obtains via the resource control part within the virtualization management mechanism a resource status on the physical computer in which there exists each system of the cluster configuration stored in the cluster status management table. Further, the program 2438 configures the resource acquisition part when the processor 101 executes a program stored as the resource status table. Herein, the resource status may be regularly obtained, or performed at the time of using the resource status table.

FIG. 27 shows the resource status table. In FIG. 27, the resource status table is configured by columns of a physical computer identifier 2701, a system identifier 2702, and a resource amount 2703. The resource amount 2703 includes each of the resource amount specified by the type of resource 2601 in the failover allowable resource definition. For example, stored are resources corresponding to the job path 111 used by the processor 101, memory 102, and NIC 103 specified in FIG. 25. In the resource amount shown in FIG. 27, the load amount 2704 of the processor, the memory amount, and the throughput of the NIC are here shown as one example; however, a different index may be used. In the system identifier, in addition to the identifier of each system as the virtual computer, the "not-yet-allocated" identifier may be included in order to show the not-yet-allocated resource amount that is not used by the virtual computer. In this case, the not-yet-allocated resource amount is stored in the resource amount 2703.

Figure 28:
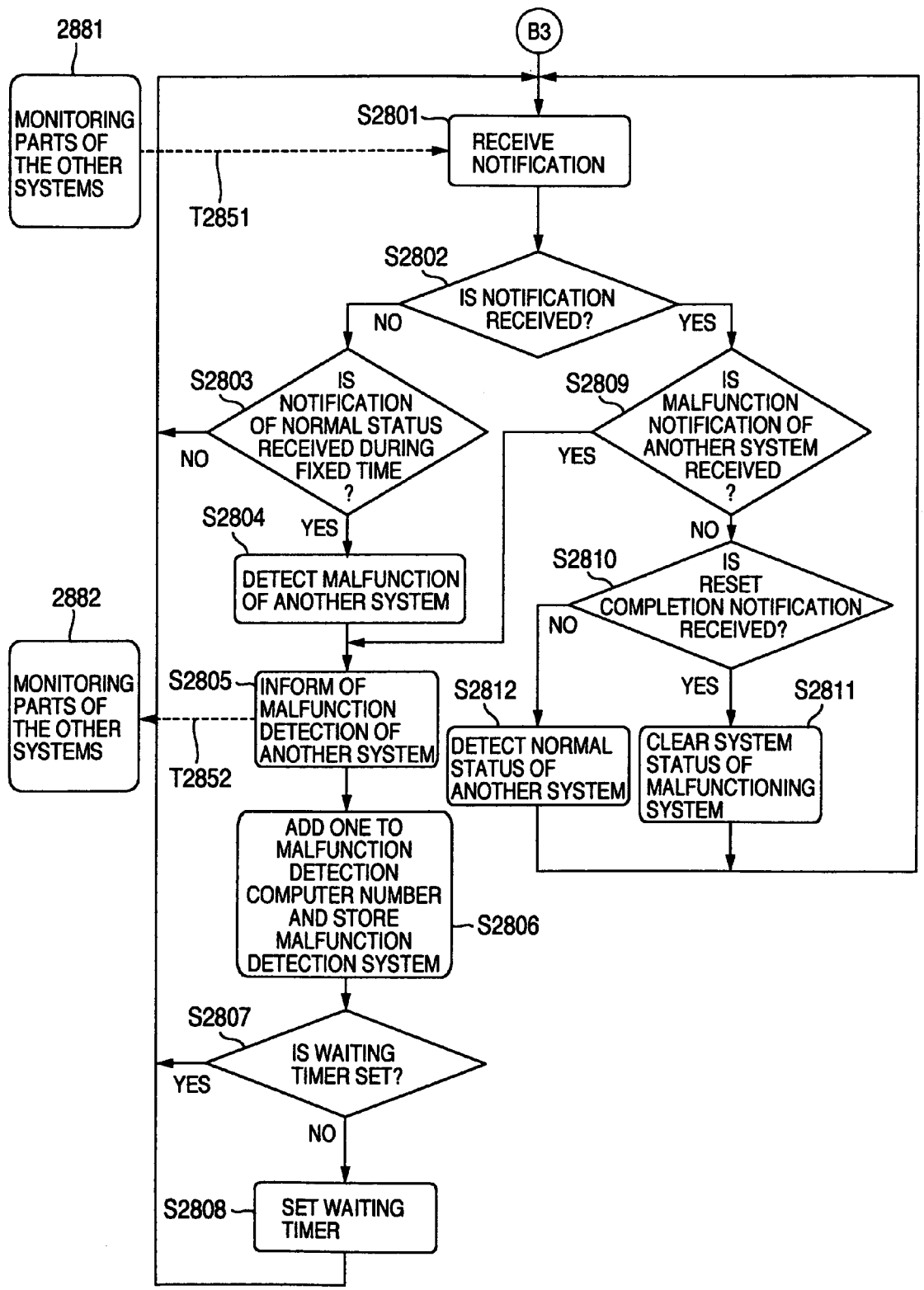
FIG. 28 is a flowchart showing one example of a processing for monitoring a malfunction according to the third embodiment of the present invention.
Figure 29:
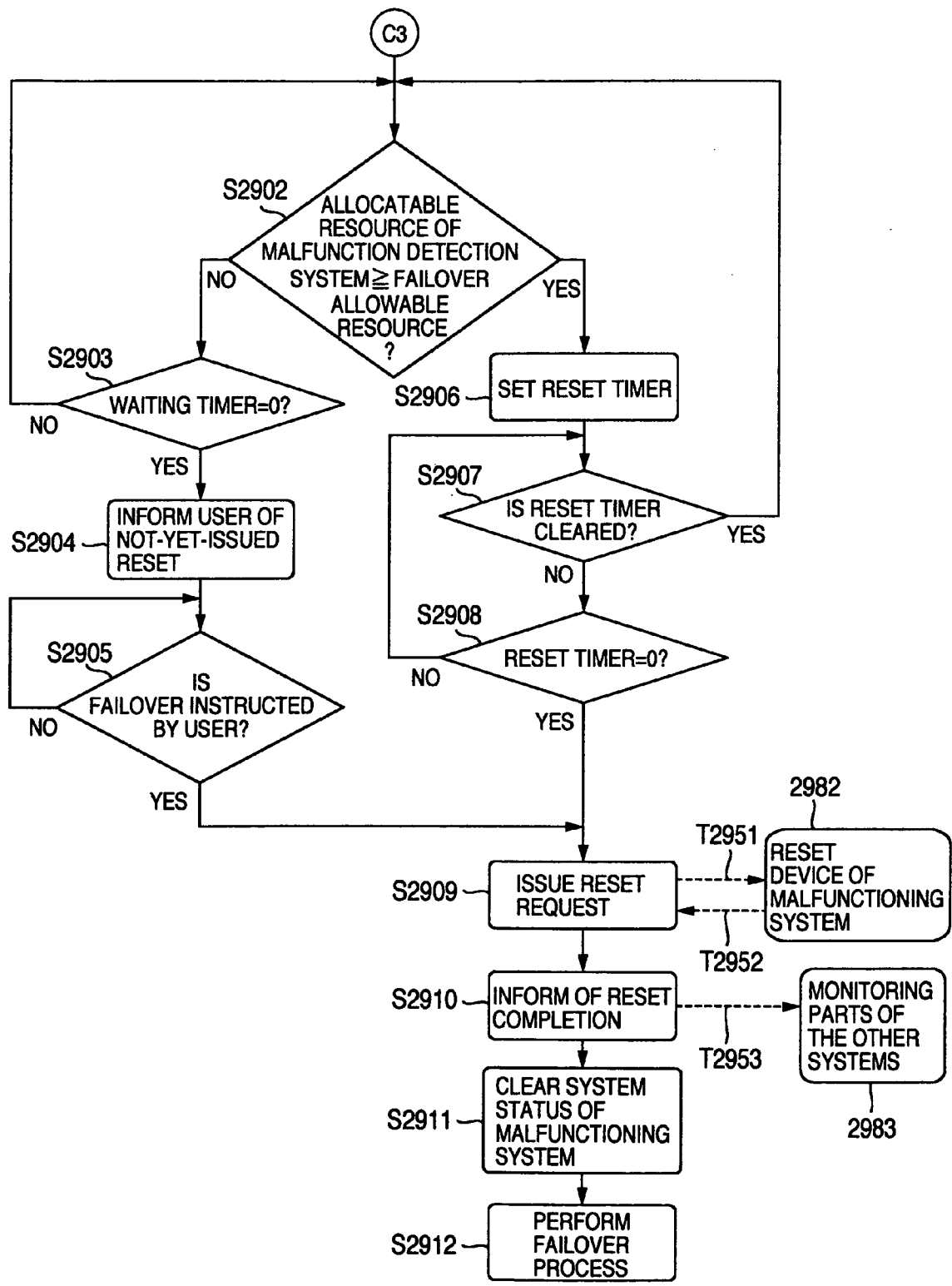
FIG. 29 is a flowchart showing one example of a processing for performing a reset at the time of detecting a malfunction according to the third embodiment of the present invention.

FIGS. 28 and 29 are flowcharts showing processes performed by the monitoring part and the failover control part, and are each obtained by partially changing the flowcharts shown in FIGS. 9 and 10 according to the first embodiment.

FIG. 28 is a flowchart showing one example of a processing in which the monitoring part monitors the malfunction and which is performed based on the monitoring results.

In FIG. 28, the monitoring part executes the same steps S2801 to S2811 as those S901 to S912 of FIG. 9. As a difference from the first embodiment, included is a process relating to the malfunction detection source identifier 2501 added to the cluster status management table. At first, in step S2806, a system which informs the monitoring part of the malfunction detection by the notification T2851 is stored in the malfunction detection source identifier 2501 in addition to a process for counting the malfunction detection computer number. Secondly, in the process 2811, the malfunction detection source identifier is also cleared as a clearing step of a system status of the malfunctioning system in addition to the same step as that S911.

Next, FIG. 29 is a flowchart showing one example of a processing in which when the malfunctioning computer malfunctions, the failover control part judges whether or not the failover allowable resource as a fixed amount of resource is satisfied, and then a reset is executed.

In FIG. 29, the failover control part executes the same steps S2901 to S2911 as those S1001 to S1011 of FIG. 10. The difference from the first embodiment is as follows. At first, in step S2902, in reference to the resource status table 2429, the failover control part calculates the resource amount that can be allocated by a system stored in the malfunction detection source identifier 2501, and judges whether or not the resource amount is greater than or equal to the failover allowable resource amount specified by the failover allowable resource definition 2436. As the allocatable resource amount, a value of the resource amount used by a system as the malfunction detection source may be here used. Alternatively, when the malfunctioning system exists with the malfunction detection source on the same physical computer, the resource amount of the malfunctioning system may be added to the resource amount of the malfunction detection source, or as the allocatable resource amount, the resource amount that is not yet allocated in the physical computer operated by the system of the malfunction detection source may be added to the resource amount of the malfunction detection source. When a process in which a resource released by the reset of the malfunctioning system or a not yet allocated resource is added to a system of the malfunction detection source via the resource control part is included in the failover step S2912, the allowable resource amount is assured.

Next, in step S1006, in the failover control part, the process for clearing the malfunction status includes a process for clearing the malfunction detection source identifier 2501 in addition to step S1006.

As described above, through the flowcharts shown in FIGS. 28 and 29, provided is a function in which whether or not the resource amount capable of keeping the performance can be used by a system as the failover destination is judged and the failover is controlled using a reset. That is, a computer that detects the malfunctioning system and that is normally operating is managed in the cluster system in which when the malfunctioning system is reset, the failover is realized. Further, when a computer is normally operating as the active computer, whether or not a fixed amount of resources required for the active computer to operate are satisfied from the resource amount of each computer is judged to execute the reset.

In addition, in the present embodiment, an example in which the resource amount of the active computer is specified is shown as the failover allowable resource amount definition; however, the resource amount of a plurality of systems may be specified. In that case, when whether or not the resource amount of a plurality of systems satisfies the failover allowable resource amount is judged, the same function can be provided in the judgment step S2901.

As described above, according to the third embodiment shown in FIGS. 24 to 29, the reset control that is performed by the failover allowable computer number in the first embodiment is performed by the resource amount of the virtual computer. Thereby, the same effect as that of the first embodiment can be provided even if the cluster system including the virtual computer is used.

In addition, the difference between one processing according to the third embodiment using the virtual computer and the resource amount and another processing according to the first embodiment using the physical computer and the computer number is applicable also to the second embodiment in the same manner. Thereby, also in the second embodiment, the same effect as that of the first embodiment can be provided using the virtual computer and the resource amount.

As described above, the present invention may be applied to an in-memory application system in which a clustering configuration is used, a shared disk is not configured, data is duplicated to a standby computer, and which operates in the memory with high I/O processing performance. Particularly, since a fixed number of computers or a fixed resource amount can be assured, the present invention may be applied to a high availability in-memory application system in which data is redundantized onto the memory within a plurality of computers and further, the failover accompanying an unnecessary reset causing the performance degradation may be prevented. Alternatively, in the cluster system in which when the malfunctioning computer is reset, the failover is realized, whether or not a fixed amount of resources needed after the failover are satisfied is judged. By using a configuration in which the reset is issued, the unnecessary reset causing the performance degradation may be prevented.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A failover control method for a computer system including a plurality of computers having a clustering configuration comprising:
   monitoring a second computer via a first line by a first computer among the plurality of computers;
   detecting a malfunction of the second computer by the first computer;
   receiving from the other computers a notification including a monitoring result for the second computer in the other computers among the plurality of computers having the clustering configuration by the first computer;
   allowing information relating to a malfunction of the detected second computer and the monitoring result to correspond to each other;
   judging whether or not the correspondence satisfies a predetermined condition; and
   when the predetermined condition is satisfied, giving the second computer a reset instruction via a second line.

2. The failover control method according to claim 1, wherein:
the predetermined condition is that the number of notifications received by the first computer reaches a predetermined number.

3. The failover control method according to claim 2, wherein:
the predetermined number is the number of computers that have the clustering configuration and that are other than the first and second computers.

4. The failover control method according to claim 2, wherein:
when the first computer detects a malfunction of the second computer, the correspondence is a numeric value obtained by adding one to the number of transmission sources of the monitoring results of the second computer; and
the predetermined condition is that the numeric value reaches the number of computers other than the second computer among computers having the clustering configuration.

5. The failover control method according to claim 1, wherein:
the monitoring results are received from one or more of the other computers; and
when the one or more of the monitoring results and information sets relating to the malfunction of the detected second computer correspond to each other, the predetermined condition is that the number of the monitoring results is the number of the other computers.

6. The failover control method according to claim 1, wherein:
the second computer is a currently-active system computer;
the first computer is a standby-system computer for the currently-active system computer; and
after transmitting the reset, a failover is performed by the first computer.

7. The failover control method according to claim 1, wherein:
when the predetermined condition is satisfied within a predetermined time, a reset instruction is performed.

8. The failover control method according to claim 7, wherein:
when the predetermined time has elapsed, the reset instruction is not performed is outputted.

9. The failover control method according to claim 1, wherein:
in step of executing the monitoring, the first computer judges whether or not a heartbeat transmitted via a first line from the second computer is received; and
in step of detecting the malfunction, detects a malfunction based on whether or not the heartbeat is accepted within a predetermined time due to a malfunction of the first computer or that of the first line.

10. The failover control method according to claim 1, wherein:
it is judged that a priority is set for the first computer, and further, whether or not the reset instruction is performed based on the priority.

11. A computer system comprising three or more of computers having a clustering configuration, wherein:
any one of the computers is a currently-active system computer that executes a predetermined application, and the other computers are standby system computers;
each of the computers has a processor, a memory connected with the processor, a first network interface connected with the processor, and a second network interface;
among the computers, when the processor of a first computer detects a communication malfunction with a second computer among the computers via the first network interface, the processor judges whether or not malfunction information on a communication with the second computer is received via the first network interface from computers other than the second computer;
when the malfunction information is received, stores the malfunction information in the memory, refers to the memory, and calculates how many computers the malfunction information is received from; and
as a result of the calculation, when the malfunction information is received from the predetermined number of computers, issues a reset request to the second computer via the second network interface.

12. The computer system according to claim 11, wherein:
when detecting a communication malfunction with the second computer, the processor issues to the other computers via the first network interface a notification to the effect that the communication malfunction with the second computer is detected.

13. The computer system according to claim 11, wherein:
when a predetermined time has elapsed since a detection of the communication malfunction with the second computer, the processor issues a forceful reset to the second computer via the second network interface.

14. The computer system according to claim 11, wherein:
the computer has an output part connected with the processor; and
when a predetermined time has elapsed since the detection of the communication malfunction with the second computer, the output part outputs a message to the effect that a reset is not yet issued.

15. A reset control device connected with a plurality of computers having a clustering configuration via a network, comprising:
a network interface connected with the network;
a processor connected with the network; and
a memory connected with the processor, wherein:
the processor receives malfunction information relating to a communication malfunction with any one of the computers via the network interface;
stores the malfunction information in the memory;
based on the malfunction information stored in the memory, judges whether or not to receive the information from a predetermined number of computers; and
as a result of the judgment, when receiving the information from the predetermined number of computers, issues a reset via the network interface to a computer in which a malfunction occurs.

16. The reset control device according to claim 15, wherein:
the predetermined number is the number of computers obtained by subtracting the number of computers relating to the malfunction information from the number of computers having the clustering configuration.

* * * * *